United States Patent [19]

Poetsch et al.

[11] Patent Number: 5,196,140

[45] Date of Patent: Mar. 23, 1993

[54] ELECTRO-OPTICAL LIQUID CRYSTAL DISPLAY ELEMENT

[75] Inventors: Eike Poetsch, Mühltal; Hans A. Kurmeier, Seeheim-Hugenheim; Rudolf Eidenschink, Bodenheim; Georg Weber, Erzhausen; Andreas Wächtler, Griesheim, all of Fed. Rep. of Germany

[73] Assignee: Merck Patent Gesellschaft Mit Beschrankter Haftung, Darmstadt, Fed. Rep. of Germany

[21] Appl. No.: 294,630

[22] PCT Filed: Apr. 21, 1988

[86] PCT No.: PCT/EP88/00335

§ 371 Date: Dec. 23, 1988

§ 102(e) Date: Dec. 23, 1988

[87] PCT Pub. No.: WO88/08441

PCT Pub. Date: Nov. 3, 1988

[30] Foreign Application Priority Data

Apr. 28, 1987 [DE] Fed. Rep. of Germany ....... 3714043

[51] Int. Cl.$^5$ ..................... C09K 19/06; C09K 19/34; C09K 19/52; G02F 1/13

[52] U.S. Cl. .......................... 252/299.6; 252/299.61; 252/299.62; 252/299.63; 252/299.64; 252/299.66; 252/299.67; 252/299.01; 570/129; 359/103; 359/106

[58] Field of Search ..................... 350/350 S; 570/129, 570/131, 129; 252/299.61, 299.62, 299.63, 299.64, 299.66, 299.67, 299.6, 299.01

[56] References Cited

U.S. PATENT DOCUMENTS

| | | | |
|---|---|---|---|
| 4,606,845 | 8/1986 | Romer et al. | 252/299.63 |
| 4,614,608 | 9/1986 | LeBarny et al. | 252/299.64 |
| 4,695,131 | 9/1987 | Balkwill et al. | 252/299.63 X |
| 4,769,176 | 9/1988 | Bradshaw et al. | 252/299.65 |
| 4,871,469 | 10/1989 | Reiffenrath et al. | 252/299.61 |
| 4,886,619 | 12/1989 | Janulis | 252/299.1 |
| 4,917,819 | 4/1990 | Goto et al. | 252/299.63 |

FOREIGN PATENT DOCUMENTS 2071087 9/1981 United Kingdom ............... 570/129

OTHER PUBLICATIONS

Titov et al., "Synthesis and Mesomorphism of Aryl p-fluoro alkyl (alkoxy) benzoates," Molecular Crystal, Liquid Crystals, vol. 47 pp. 1-5 (1978).

*Primary Examiner*—Robert L. Stoll
*Assistant Examiner*—C. Harris
*Attorney, Agent, or Firm*—Millen, White, Zelano and Branigan

[57] ABSTRACT

The invention relates to an electro-optical liquid crystal display element containing a dielectric with at least two liquid-crystalline components, wherein the dielectric, for shortening the switching times, contains at least one fluorine-containing compound of the formula I $$R^1-(A^1-Z^1)_m-A^2-R^2 \qquad \qquad I$$

wherein the radicals $R^1$, $R^2$, $A^1$, $A^2$, $Z^1$ and m have the meaning given in claim 1.

8 Claims, No Drawings

ELECTRO-OPTICAL LIQUID CRYSTAL DISPLAY ELEMENT

The invention relates to an electro-optical liquid crystal display element containing a dielectric with at least two liquid-crystalline components, characterized in that, for shortening the switching times, the dielectric contains at least one fluorine-containing compound of the formula I $$R^1-(A^1-Z^1)_m-A^2-R^2 \quad\quad I$$

wherein
one of the radicals $R^1$ and $R^2$ is H, F, Cl, Br, —CN, —NCS or an unsubstituted or substituted alkyl group having 1-15 C atoms, in which one or two $CH_2$ groups can also be replaced by a grouping selected from the group comprising —O—, —CO—, —O—CO—, —CO—O—, —CH—halogen—, —CHCN—, —CCH$_3$CN—, —C≡C— and —CH=CH—, no 2 heteroatoms being directly linked to one another, the other radical $R^1$ or $R^2$ is a perfluoroalkyl group having 1-15 C atoms, in which one or more $CF_2$ groups can also be replaced by a grouping selected from the group comprising —O—, —CO—, —O—CO—, —CO—O—, —CH$_2$—, —CH—halogen—, —CHCN—, —C≡C—, —CH=CH—, —CH=C—halogen— and —C—halogen=C—halogen—, no two heteroatoms being directly linked to one another and the perfluoroalkyl group containing at least two $CF_2$ groups, $A^1$ and $A^2$ independently of one another are each 1,4-phenylene which is unsubstituted or substituted by one or two F and/or Cl atoms and/or $CH_3$ groups and/or CN groups and in which one or two CH groups can also be replaced by N atoms, 1,4-cyclohexylene in which one or two non-adjacent $CH_2$ groups can also be replaced by 0 atoms and/or S atoms, piperidine-1,4-diyl, 1,4-bicyclo[2.2.2]octylene, unsubstituted or CN-substituted decahydronaphthalene-2,6-diyl or 1,2,3,4-tetrahydronaphthalene-2,6-diyl, and $A^2$ is also a single bond, m is 0, 1, 2 or 3 and $Z^1$ is —CO—O—, —O—CO—, —OCH$_2$—, —CH$_2$O—, —CH$_2$—CH$_2$—, substituted ethylene or a single bond, it being possible for the groups $A^1$ and $Z^1$ to be identical or different in the case of m=2 or 3, with the proviso that, in the case of m=0, the sum of the number of C atoms in the two groups $R^1$ and $R^2$ is at least 8, and to fluorine-containing additives for liquid-crystalline dielectrics which are suitable for shortening the switching times in electro-optical liquid crystal display elements. The invention also relates to novel compounds of the formula I, which correspond to the formulae I, III and IV.

Liquid-crystalline dielectrics can be used in various electro-optical display elements, in particular in displays which ... (sic) on the principle of the twisted cell (TN displays), the Guest-Host effect, the effect of the deformation of aligned phase, the effect of dynamic scattering, the SBE effect (supertwisted birefringent effect), in STN displays (supertwisted nematic displays) and in ferroelectric displays, for example based on SSFLC technology. The expression "dielectric" used in this application thus relates to mixtures which contain a nematic, cholesteric or smectic (especially Sc*) mesophase.

In order to be suitable for the display elements listed above, the dielectrics must meet a large number of very diverse demands matched to the particular display principle, which, however, include in virtually every case very short switching times which, inter alia, can also be achieved by viscosity-reducing additives. Such additives have already been described in the literature (German Offenlegungsschrift 2,548,360, German Offenlegungsschrift 2,823,909). Disadvantages of these known additives are, however, the lowering of the clear point which must be accepted and/or the high vapor pressure of these additives.

It was the object of the invention to provide novel stable dielectrics with fluorine-containing additives, which do not show the above disadvantages, or only to a small extent.

It has now been found that the compounds of the formula I are outstandingly suitable as additives for diverse dielectrics.

Moreover, by the provision of the compounds of the formula I, the range of additives for liquid-crystalline dielectrics, which are suitable for the preparation of liquid-crystalline mixtures under various application aspects, is quite generally widened considerably.

For the sake of simplicity, in the text which follows, Phe designates a 1,4-phenylene group, Cy designates a 1,4-cyclohexylene group, Dio designates a 1,3-dioxane-2,5-diyl group, Bi designates a bicyclo(2,2,2)octylene group, Pyd designates a pyridine-2,5-diyl group and Pyr designates a pyrimidine-2,5-diyl group, it being possible for these groups to be unsubstituted or substituted.

The compounds of the formula I have a wide range of application. Depending on the choice of the substituents, these compounds can be added to liquid-crystalline dielectrics, which are suitable for the most diverse applications, from other classes of compounds.

The invention thus relates to electro-optical liquid crystal display elements containing a dielectric with at least two liquid-crystalline components, characterized in that, for shortening the switching times, the dielectric contains at least one fluorine-containing compound of the formula I $$R^1-(A^1-Z^1)_m-A^2-R^2 \quad\quad I$$

wherein
one of the radicals $R^1$ and $R^2$ is H, F, Cl, Br, —CN, —NCS or an unsubstituted or substituted alkyl group having 1-15 C atoms, in which one or two $CH_2$ groups can also be replaced by a grouping selected from the group comprising —O—, —CO—, —O—CO—, —CO—O—, —CH—halogen—, —CHCN—, —CCH$_3$CN—, —C≡C— and —CH=CH—, no 2 heteroatoms being directly linked to one another, the other radical $R^1$ or $R^2$ is a perfluoroalkyl group having 1-15 C atoms, in which one or more $CF_2$ groups can also be replaced by a grouping selected from the group comprising —O—, —CO—, —O—CO—, —CO—O—, —CH$_2$—, —CH—halogen—, —CHCN—, —C≡C—, —CH=CH—, —CH=C—halogen— and —C—halogen=C—halogen—, no two heteroatoms being directly linked to one another and the perfluoroalkyl group containing at least two CF$_2$ groups, A$^1$ and A$^2$ independently of one another are each 1,4-phenylene which is unsubstituted or substituted by one or two F and/or Cl atoms and/or CH$_3$ groups and/or CN groups and in which one or two CH groups can also be replaced by N atoms, 1,4-cyclohexylene in which one or two non-adjacent CH$_2$ groups can also be replaced by O atoms and/or S atoms, piperidine-1,4-diyl, 1,4-bicyclo[2.2.2]octylene, unsubstituted or CN-substituted decahydronaphthalene-2,6-diyl or 1,2,3,4-tetrahydronaphthalene-2,6-diyl, and A$^3$ is also a single bond, m is 0, 1, 2 or 3 and Z$^1$ is —CO—O—, —O—CO—, —OCH$_2$—, —CH$_2$O—, —CH$_2$—CH$_2$—, substituted ethylene or a single bond, it being possible for the groups A$^1$ and Z$^1$ to be identical or different in the case of m=2 or 3, with the proviso that, in the case of m=0, the sum of the number of C atoms in the two groups R$^1$ and R$^2$ is at least 8, and to liquid-crystalline dielectrics with at least two liquid-crystalline components which contain at least one compound of the formula I. The invention also relates to the use of the compounds of the formula I as components of liquid-crystalline dielectrics for electro-optical display elements, to fluorine compounds of the formula II

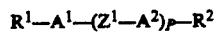

R$^1$—(A$^1$—Z$^1$)$_m$—A$^2$—R$^2$     II wherein one of the radicals R$^1$ and R$^2$ is H, F, Cl, Br, —CN, —NCS or an unsubstituted or substituted alkyl group having 1-15 C atoms, in which one or two CH$_2$ groups can also be replaced by a grouping selected from the group comprising —O—, —CO—, —O—CO—, —CO—O—, —CH—halogen—, —CHCN—, —CCH$_3$CN—, —C≡C— and —CH═CH—, no 2 heteroatoms being linked directly to one another, the other radical R$^1$ or R$^2$ is a perfluoroalkyl group having 1-15 C atoms, in which one or more CF$_2$ groups can also be replaced by a grouping selected from the group comprising —O—, —CO—, —O—CO—, —CO—O—, —CH$_2$—, —CH—halogen—, —CHCN—, —C≡C—, —CH═CH—, —CH═C—halogen— and —C—halogen═C—halogen—, no 2 heteroatoms being linked directly to one another and the perfluroalkyl group containing at least two CF$_2$ groups, A$^1$ is trans-1,4-cyclohexylene which is unsubstituted or substituted by one or two F and/or Cl atoms and/or CH$_3$ groups and/or CN groups and in which one or two non-adjacent CH$_2$ groups can also be replaced by O and/or S or —CH— groups can be replaced by N, 1,4-bicyclo[2.2.2]octylene, decahydronaphthalene-2,6-diyl or 1,2,3,4-tetrahydronaphthalene-2,6-diyl, A$^2$ is 1,4-phenylene which is unsubstituted or substituted by one or two F and/or Cl atoms and/or CH$_3$ groups and/or CN groups and in which one or two CH groups can also be replaced by N atoms, 1,4-cyclohexylene in which one or two non-adjacent CH$_2$ groups can also be replaced by O atoms and/or S atoms, piperidine-1,4-diyl, 1,4-bicyclo[2.2.2]octylene, unsubstituted or CN-substituted decahydronaphthalene-2,6-diyl or 1,2,3,4-tetrahydronaphthalene-2,6-diyl, m is 0 or 1 and Z$^1$ is —CO—O—, —O—CO—, —OCH$_2$—, —CH$_2$O—, —CH$_2$—CH$_2$—, substituted ethylene or a single bond, and to nitrogen-containing heterocyclic compounds of the formula III R$^1$—A$^1$—(Z$^1$—A$^2$)$_p$—R$^2$     III wherein one of the radicals R$^1$ and R$^2$ is H, F, Cl, Br, —CN, —NCS or an unsubstituted or substituted alkyl group having 1-15 C atoms, in which one or two CH$_2$ groups can also be replaced by a grouping selected from the group comprising —O—, —CO—, —O—CO—, —CO—O—, —CH—halogen—, —CHCN—, —C≡C— and —CH═CH—, no 2 heteroatoms atoms being directly linked to one another, the other radical R$^1$ or R$^2$ is a perfluoroalkyl group having 1-15 C atoms, in which one or more CF$_2$ groups can also be replaced by a grouping selected from the group comprising —O—, —CO—, —O—CO—, —CO—O—, —CH$_2$—, —CH—halogen—, —CHCN—, —C≡C—, —CH═CH—, —CH═C—halogen— and —C—halogen═C—halogen—, no 2 heteroatoms being directly linked to one another and the perfluoroalkyl group containing at least two CF$_2$ groups, A$^1$ is —A$^3$—Z$^2$—A— or —A—Z$^2$—A$^3$—, A is a 1,4-phenylene group in which at least one CH group is replaced by N, A$^3$ is 1,4-phenylene which is unsubstituted or substituted by one or two F and/or Cl atoms and/or CH$_3$ groups and/or CN groups and in which one or two CH groups can also be replaced by N atoms, A$^2$ is 1,4-phenylene which is unsubstituted or substituted by one or two F and/or Cl atoms and/or CH$_3$ groups and/or CN groups and in which one or two CH groups can also be replaced by N atoms, 1,4-cyclohexylene in which one or two non-adjacent CH$_2$ groups can also be replaced by O atoms and/or S atoms, piperidine-1,4-diyl, 1,4-bicyclo[2.2.2]octylene, unsubstituted or CN-substituted decahydronaphthalene-2,6-diyl or 1,2,3,4-tetrahydronaphthalene-2,6-diyl, Z$^1$ and Z$^2$ independently of one another are each —CO—O—, —O—CO—, —OCH$_2$—, —OCH$_2$O—, —CH$_2$CH$_2$—, substituted ethylene or a single bond and p is 0, 1 or 2, it being possible for the groups Z$^1$ and A$^2$ to be identical or different in the case of p=2.

The invention also relates to fluorine compounds of the formula IV

R$^1$—(A$^1$—Z$^1$)$_m$—A$^2$—R$^2$     IV wherein

R$^1$ is an alkyl group having 1-15 C atoms, in which one or two CH$_2$ groups can also be replaced by a grouping selected from the group comprising —O—, —CO—, —O—CO—, —CO—O—, —CH—halogen—, —CHCN—, —CCH$_3$CN—, —C≡C— and —CH═CH—, no 2 heteroatoms being directly linked to one another, $R^2$ is a perfluoroalkyl group having 1–15 C atoms, in which one or more $CF_2$ groups can also be replaced by a grouping selected from the group comprising —O—, —CO—, —O—CO—, —CO—O—, —CH₂—, —CH—halogen—, —CHCN—, —C≡C—, —CH=CH—, —CH=C—halogen— and —C—halogen=C—halogen—, no two heteroatoms being directly linked to one another and the perfluoroalkyl group containing at least two $CF_2$ groups, $A^1$ is 1,4-cyclohexylene in which one or two nonadjacent $CH_2$ groups can also be replaced by O atoms and/or S atoms, $A^2$ is 1,4-phenylene which is unsubstituted or substituted by one or two F atoms, m is 1 or 2 and $Z^1$ is —CO—O—, —O—CO—, —OCH₂—, —OCH₂O—, —CH₂—CH₂— or a single bond, it being possible for the groups $A^1$ and $Z^1$ to be identical or different in the case of m=2. In the case of m=1, $A^2$ is here preferably 1,4-phenylene which is substituted by one or two F atoms.

In the preceding and following text, $R^1$, $R^2$, $A^1$, $A^2$, $A^3$, A, $Z^1$, $Z^2$, m and p have the meaning given under the formulae I, II, III and IV, unless specifically stated otherwise.

The compounds of the formula I accordingly comprise in particular compounds of the part formulae Ia, Ib (with 1 ring), Ic (with 2 rings), Id (with 3 rings) and Ie (with 4 rings):

| | |
|---|---|
| $R^1—R^2$ | Ia |
| $R^1—A^2—R^2$ | Ib |
| $R^1—A^1—Z^1—A^2—R^2$ | Ic |
| $R^1—A^1—Z^1—A^1—Z^1—A^2—R^2$ | Id |
| $R^1—A^1—Z^1—A^1—Z^1—A^1—Z^1—A^2—R^2$ | Ie |

Compounds of the formulae Ic are particularly preferred. In the compounds of the formulae Id and Ie, the groups $A^1$ and $Z^1$ can be identical or different. The groups $Z^1$ are here preferably single bonds. Those compounds of the formulae Id or Ie are also preferred in which one of the groups $Z^1$ is —CH₂CH₂—, —O—CO— or —CO—O— and the other group(s) $Z^1$ is or are a single bond.

The compounds of the formula Ia comprise those of the preferred part formulae Iaa–Iae:

| | |
|---|---|
| $C_nF_{2n+1}—C_mH_{2m+1}$ | Iaa |
| $C_nF_{2n+1}OCF_2CF_2OC_mH_{2m+1}$ | Iab |
| $C_nF_{2n+1}OCF_2CF_2OCF_2CF_2OC_mH_{2m+1}$ | Iac |
| $C_nF_{n+1}COCH_2COC_mH_{2m+1}$ | Iad |
| $C_nF_{n+1}CN$ | Iae |

Those of the part formula Iaa are particularly preferred amongst these.

The compounds of the formula Ib comprise those of the preferred part formulae Iba–Ibd:

| | |
|---|---|
| $C_nF_{2n+1}CyCN$ | Iba |
| $C_nF_{2n+1}CyC_mH_{2n+1}$ | Ibb |
| $C_nF_{2n+1}CyOC_mH_{2m+1}$ | Ibc |
| $C_nF_{2n+1}PheCN$ | Ibd |

Those of the part formula Iba are particularly preferred amongst these.

In these part formulae Iaa to Ibd, n and m are each independently of one another 1–5, preferably 2–8.

The compounds of the formula Ic comprise those of the preferred part formulae Ica to Icd:

| | |
|---|---|
| $R^1—Cy—Z^1—Cy—R^2$ | Ica |
| $R^1—Cy—Z^1—Phe—R^2$ | Icb |
| $R^1—Phe—Z^1—Phe—R^2$ | Icc |
| $R^1—Phe—Z^1—Pyr—R^2$ | Icd |

Those of the part formula Icb are particularly preferred amongst these.

The compounds of the formula Id comprise those of the preferred part formulae Ida to Idg:

| | |
|---|---|
| $R^1—Phe—Z^1—Phe—Z^1—Cy—R^2$ | Ida |
| $R^1—Pyr—Z^1—Phe—Z^1—Cy—R^2$ | Idb |
| $R^1—Phe—Z^1—Pyr—Z^1—Cy—R^2$ | Idc |
| $R^1—Cy—Z^1—Phe—Z^1—Phe—R^2$ | Idd |
| $R^1—Cy—Z^1—Cy—Z^1—Phe—R^2$ | Ide |
| $R^1—Cy—Z^1—Phe—Z^1—Cy—R^2$ | Idf |
| $R^1—Cy—Z^1—Cy—Z^1—Cy—R^2$ | Idg |

One of the radicals $R^1$ and $R^2$ is preferably alkyl, alkoxy, alkanoyloxy, alkoxycarbonyl, oxaalkoxy or oxaalkyl having preferably 2 to 12 C atoms. Alkyl is particularly preferred.

$A^1$ and $A^2$ are preferably Cy, Phe or Pyr. Preferably, the compounds of the formula I contain only one Pyr or Dio group. m is preferably 1 or 2 and especially preferably 1.

The alkyl radicals in the groups $R^1$ and/or $R^2$ can be straight-chain or branched. Preferably, they are straight-chain, have 2, 3, 4, 5, 6, 7, 8, 9, 10, 11 or 12 C atoms and, accordingly, preferably are ethyl, propyl, butyl, pentyl, hexyl, heptyl, octyl, nonyl, decyl, undecyl or dodecyl, and also methyl, tridecyl, tetradecyl or pentadecyl.

If these radicals are alkyl radicals in which one ("alkoxy" or "oxaalkyl") or two ("alkoxyalkoxy" or "dioxaalkyl" $CH_2$ groups are replaced by O atoms, these can be straight-chain or branched. Preferably, they are straight-chain, have 2, 3, 4, 5, 6 or 7 C atoms and, accordingly, are preferably ethoxy, propoxy, butoxy, pentoxy, hexoxy, heptoxy, 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, and also methoxy, octoxy, nonoxy, decyloxy, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl, 1,3-dioxabutyl (=methoxymethoxy), 1,3-, 1,4- or 2,4-dioxapentyl, 1,3-, 1,4-, 1,5-, 2,4-, 2,5- or 3,5-dioxahexyl or 1,3-, 1,4-, 1,5-, 1,6-, 2,4-, 2,5-, 2,6-, 3,5-, 3,6- or 4,6-dioxaheptyl.

Compounds of the formula I and of the part formulae given above and below with branched wing groups can sometimes be of importance because of higher solubility in the usual liquid-crystalline base materials, but especially as chiral doping agents, if they are optically active. Such compounds are also suitable as components of ferroelectric materials. Branched groups of this type do not as a rule contain more than one chain branching. Preferred branched radicals are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl, 3-oxa-4-methylpentyl and 2-octyloxy.

One of the two radicals $R^1$ and $R^2$ in the compounds of the formulae I, II and III and $R^2$ in the compounds of the formula IV is a perfluoroalkyl group having 1-15 C atoms, in which one or more $CF_2$ groups can also be replaced by a grouping selected from the group comprising —O—, —CO—, —O—CO—, —CO—O—, —CH$_2$—, CHhalogen, —CHCN—, —≡C—, —CH═CH—, —CH═CHhalogen— and Chalogen═C—halogen—, no two heteroatoms being directly linked to one another and the perfluoroalkyl group containing at least two $CF^2$ groups. The perfluoroalkyl group defined accordingly is preferably of the formula

—X'—Q'—Y'—R$^5$ in which X' is —CO—O—, —O—CO—, —O—CO—O—, —CO—, —O—, —S—, —CH═CH—, —CH═CH—COO—, —CH$_2$CH$_2$—, —CH$_2$CH$_2$— COO— or a single bond, Q' is alkylene having 1 to 5 C atoms, in which one CH$_2$ group not linked to X' can also be replaced by —O—, —CO—, —O—CO—, —CO—O— or —CH═CH—, or a single bond, Y' is perfluoroalkylene having 2 to 15 C atoms, in which one or more $CF_2$ groups can also be replaced by —CHF— or —CF═CF—, and R$^5$ is H, F or an alkyl group having 1 to 5 C atoms, in which one or two non-adjacent CH$_2$ groups can also be replaced by —O—, —CO—, —O—CO—, —CO—O— and/or —CH═CH—, with the proviso that the group of the formula —X'—Q'—Y'—R$^5$ does not contain more than 15 C atoms in total and contains at least two $CF_2$ groups.

X' is preferably —O—, —O—CO—, —CO—O—, —CH═CH— (trans), —CH$_2$CH$_2$—, —COO—CH$_2$— or a single bond.

Q' is preferably —CH$_2$— or a single bond. Y' is preferably straight-chain perfluoroalkylene having 2 to 8 C atoms, especially preferably 2 to 6 C atoms. R$^5$ is preferably H or F, especially preferably F.

Particularly preferred radicals —X'—Q'—Y'—R$^5$ are thus R$_F$, —O—R$_F$, —CH═CH—R$_F$, —CH$_2$CH$_2$—R$_F$, —COO—R$_F$, —OOCR$_F$, —COO—CH$_2$—R$_F$ and —OOC—CH$_2$—R$_F$, wherein R$_F$ is a preferably straight-chain perfluoroalkyl group in which one F (especially in the ω-position) can also be replaced by H.

Very particularly preferred radicals —X'—Q'—Y'—R$^5$ are, for example, those of the formulae 1-13:

—OC$_2$F$_5$  1

—C$_2$F$_5$  2

—OC$_2$F$_4$H  3

—C$_3$F$_7$  4

—CO—C$_8$F$_{17}$  5

—COO—CH$_2$—CF$_2$—CHF$_2$  6

—CH═CH—C$_6$F$_{13}$  7

—CH$_2$CH$_2$—C$_6$F$_{13}$  8

—CH$_2$CH$_2$—C$_3$F$_7$  9

—CH═CH—COO—CH$_2$CH$_2$—C$_8$F$_{17}$  10

—CH═CH—COO—CH$_2$—C$_4$F$_8$H  11

—C$_6$F$_{13}$  12

—C$_9$F$_{19}$  13

$A^1$ and $A^2$ are preferably Cy, Phe or Pyr, and Phe can, if appropriate, also be 1,4-phenylene laterally substituted by fluorine. $Z^1$ and $Z^2$ are preferably —CO—O—, —O—CO—, —CH$_2$CH$_2$— or single bonds, especially preferably single bonds. m is preferably 1.

Some of the compounds of the formula I are novel (especially those of the formula II, III and IV). All the compounds of the formula I are prepared by methods known per se, such as are described in the literature (for example in the standard works such as Houben-Weyl, Methoden der Organischen Chemie [Methods of organic chemistry], Georg-Thieme-Verlag, Stuttgart), and in particular under reaction conditions which are known and suitable for the said reactions. Variants which are known per se but not mentioned here in more detail, can also be utilized here.

If desired, the starting materials can also be formed in situ, in such a way that they are not isolated from the reaction mixture but immediately converted further into the compounds of the formula I.

The novel compounds of the formula II comprise compounds of the part formulae IIa, IIb and IIc:

$R^1$—$A^2$—$R^2$  IIa $R^1$—$A^1$—$A^2$—$R^2$  IIb $R^1$—$A^1$—$Z^1$—$A^2$—$R^2$  IIc

Those of the part formulae IIb and IIc, especially IIb, are preferred amongst these.

Part formula IIa comprises preferred compounds of the formulae IIaa to IIae:

$R^1$—Cy—$R^2$  IIa $R^1$—Dio—$R^2$  IIab $R^1$—Phe—$R^2$  IIac $R^1$—Pyd—$R^2$  IIad $R^1$—Pyr—$R^2$  IIae

In compounds of the part formula IIa, the sum of the number of C atoms in the two groups $R^1$ and $R^2$ is preferably at least 8.

Part formula IIb comprises preferred compounds of the formulae IIba to IIbf:

| | |
|---|---|
| R¹—Cy—Cy—R² | IIba |
| R¹—Cy—Dio—R² | IIbb |
| R¹—Cy—Phe—R² | IIbc |
| R¹—Cy—Pyd—R² | IIbd |
| R¹—Cy—Pyr—R² | IIbe |
| R¹—Dio—Phe—R² | IIbf |

Those of the part formulae IIba and IIbc, especially IIba, are particularly preferred amongst these.

Part formula IIc comprises preferred compounds of the formulae IIca to IIcf:

| | |
|---|---|
| R¹—Cy—Z¹—Cy—R² | IIca |
| R¹—Cy—Z¹—Cio—R² | IIcb |
| R¹—Cy—Z¹—Phe—R² | IIcc |
| R¹—Cy—Z¹—Pyd—R² | IIcd |
| R¹—Cy—Z¹—Pyr—R² | IIce |
| R¹—Dio—Z¹—Phe—R² | IIcf |

In the compounds of the part formula IIc, Z¹ is preferably —CO—O—, —O—CO— or —CH₂CH₂—.

In the compounds of the formulae II, A¹ is preferably unsubstituted trans-1,4-cyclohexylene, 1,4-bicyclo[2.2.2]octylene, trans-1,3-dioxane-2,5-diyl or trans-tetrahydropyran-2,5-diyl. trans-1,4-Cyclohexylene is particularly preferred. A² is preferably unsubstituted 1,4-phenylene, pyridine-2,5-diyl, pyrimidine-2,5-diyl or trans-1,4-cyclohexylene. Particularly preferred meanings of A² are trans-1,4-cyclohexylene and 1,4-phenylene. Z¹ is preferably a single bond.

The novel compounds of the formula III comprise compounds of the part formulae IIIa to IIIe:

| | |
|---|---|
| R¹—A³—Z²—A—R² | IIIa |
| R¹—A³—Z²—A—Z¹—A²—R² | IIIb |
| R¹—A—Z²—A³—Z¹—A²—R² | IIIc |
| R¹—A³—Z²—A—Z¹—A²—Z¹—A²—R² | IIId |
| R¹—A—Z²—A³—Z¹—A²—Z¹—A²—R² | IIIe |

Those of the part formulae IIIa, IIIb and IIIc, but especially IIIa, are particularly preferred amongst these.

Part formula IIIa comprises preferred compounds of the formulae IIIaa to IIIac:

| | |
|---|---|
| R¹—Phe—Z²—A—R² | IIIaa |
| R¹—Pyd—Z²—A—R² | IIIab |
| R¹—Pyr—Z²—A—R² | IIIac |

Those of the part formula IIIaa are particularly preferred amongst these. In the compounds of the part formula IIIa, Z² is preferably —CO—O—, —O—CO—, —CH₂CH₂— or a single bond, a single bond being particularly preferred.

Part formula IIIb comprises preferred compounds of the formulae IIIba to IIIbg:

| | |
|---|---|
| R¹—Phe—Z²—A—Z¹—Phe—R² | IIIba |
| R¹—Phe—Z²—A—Z¹—Cy—R² | IIIbb |
| R¹—Phe—Z²—A—Z¹—Dio—R² | IIIbc |
| R¹—Pyd—Z²—A—Z¹—Phe—R² | IIIbd |
| R¹—Pyd—Z²—A—Z¹—Cy—R² | IIIbe |
| R¹—Pyr—Z²—A—Z¹—Phe—R² | IIIbf |
| R¹—Pyr—Z²—A—Z¹—Cy—R² | IIIbg |

Those of the part formulae IIIba and IIIbb are particularly preferred amongst these.

Part formula IIIc comprises preferred compounds of the formulae IIIca to IIIcg:

| | |
|---|---|
| R¹—A—Z²—Phe—Z¹—Phe—R² | IIIca |
| R¹—A—Z²—Phe—Z¹—Cy—R² | IIIcb |
| R¹—A—Z²—Phe—Z¹—Dio—R² | IIIcc |
| R¹—A—Z²—Pyd—Z¹—Phe—R² | IIIcd |
| R¹—A—Z²—Pyd—Z¹—Cy—R² | IIIce |
| R¹—A—Z²—Pyr—Z¹—Phe—R² | IIIcf |
| R¹—A—Z²—Pyr—Z¹—Cy—R² | IIIcg |

Those of the part formulae IIIca and IIIcb are particularly preferred amongst these.

In the compounds of the part formulae IIIb and IIIc, preferably at least one of the groups Z¹ and Z² is a single bond and the other group Z¹ or Z² is a group selected from the group comprising —CO—O—, —O—CO—, —CH₂CH₂— and a single bond. Corresponding compounds with Z¹=Z²=a single bond are particularly preferred.

In the compounds of the formula III, A¹ is preferably A²—Z²—A³—. A is preferably pyridine-2,5-diyl or pyrimidine-2,5-diyl. A³ is preferably 1,4-phenylene, pyridine-2,5-diyl or pyrimidine-2,5-diyl, particularly preferably 1,4-phenylene. A² is preferably 1,4-phenylene, trans-1,4-cyclohexylene, trans-1,3-dioxane-2,5-diyl or trans-tetrahydropyran-2,5-diyl, especially preferably 1,4-phenylene or trans-1,4-cyclohexylene. Z¹ and Z² k are preferably single bonds, —CO—O—, —O—CO— or —CH₂CH₂, and preferably at most one group Z¹ and Z² is a grouping other than a single bond. p is preferably 0 or 1, particularly preferably 0.

The novel compounds of the formula IV comprise compounds of the part formulae IVa and IVb (with two rings) and IVc to IVe (with three rings):

| | |
|---|---|
| R¹—A¹—A²—R² | IVa |
| R¹—A¹—Z¹—A²—R² | IVb |
| R¹—A¹—A¹—A²—R² | IVc |
| R¹—A¹—Z¹—A¹—A²—R² | IVd |

R¹—A¹—A¹—Z¹—A²—R²        IVe

Those of the formulae IVb, IVc, IVd and IVe, especially of the formulae IVc and IVe, are preferred amongst these.

For the sake of simplicity, in the preceding and following text, PheX designates 1,4-phenylene which is substituted by one or two F atoms.

Part formula IVa comprises preferred compounds of the formulae IVaa to IVad:

R¹—CY—PheX—R²        IVaa

R¹—Dio—PheX—R²        IVab

R¹—Dit—PheX—R²        IVac

R¹—Cy—Phe—R²        IVad

Those of the formulae IVaa and IVad are particularly preferred amongst these.

Part formula IVb comprises preferred compounds of the formulae IVba to IVbd:

R¹—Cy—Z¹—PheX—R²        IVba

R¹—Dio—Z¹—PheX—R²        IVbb

R¹—Dit—Z¹—PheX—R²        IVbc

R¹—Cy—Z¹—Phe—R²        IVbd

Those of the formulae IVba and IVbd are particularly preferred amongst these.

Part formula IVc comprises preferred compounds of the formulae IVca to IVce:

R¹—Cy—Cy—Phe—R²        IVca

R¹—Cy—Cy—PheX—R²        IVcb

R¹—Dio—Cy—Phe—R²        IVcc

R¹—Dit—Cy—Phe—R²        IVcd

R¹—A¹—Cy—PheX—R²        IVce

Those of the formulae IVca and IVcb are particularly preferred amongst these.

Part formula IVd comprises preferred compounds of the formulae IVda to IVdh:

R¹—Cy—Z¹—Cy—Phe—R²        IVda

R¹—Cy—Z¹—Cy—PheX—R²        IVdb

R¹—A¹—Z¹—Cy—Phe—R²        IVdc

R¹—Cy—Z¹—A¹—Phe—R²        IVdd

R¹—Cy—Z¹—A¹—PheX—R²        IVde

R¹—A¹—Z¹—Cy—PheX—R²        IVdf

R¹—Cy—CH₂CH₂—Cy—Phe—R²        IVdg

R¹—Cy—CH₂CH₂—Cy—PheX—R²        IVdh

Those of the formulae IVda, IVdb, IVdg and IVdh are particularly preferred amongst these.

Part formula IVe comprises preferred compounds of the formulae IVea to IVej:

R¹—Cy—Cy—Z¹—Phe—R²        IVea

R¹—Cy—Cy—Z¹—PheX—R²        IVeb

R¹—A¹—Cy—Z¹—Phe—R²        IVec

R¹—A¹—Cy—Z¹—PheX—R²        IVed

R¹—Cy—A¹—Z¹—Phe—R²        IVee

R¹—Cy—A¹—Z¹²—PheX—R²        IVef

R¹—Cy—Cy—CH₂CH₂—Phe—R²        IVeg

R¹—Cy—Cy—CH₂CH₂—PheX—R²        IVeh

R¹—Cy—Cy—COO—Phe—R²        IVei

R¹—Cy—Cy—COO—PheX—R²        IVej

Those of the formulae IVea, IVeb, IVeg and IVei are particularly preferred amongst these.

$Z^1$ in the compounds of the part formulae IVb, IVd and IVe is preferably —CH₂CH₂—, —COO— or —OCO—, and also preferably a single bond.

$A^1$ is preferably 1,4-cyclohexylene and $A^2$ is 1,4-phenylene which is unsubstituted or substituted by 2 fluorine atoms in the 2- and 3-positions. m is 1 or 2, preferably 2.

$R^2$ in the formula IV and the corresponding part formulae is a perfluoroalkyl group of the formula —X-'Q'—Y'—$R^5$ with the meanings already given.

$R^1$ in the formula IV and one of the radicals $R^1$ or $R^2$ in the formulae I, II and III are preferably alkyl, alkoxy, alkoxy carbonyl or oxaalkyl preferably having 2-12 C atoms. Alkyl is particularly preferred.

The alkyl radicals in the groups $R^1$ and/or $R^2$ can be straight-chain or branched. Preferably, they are straight-chain, have 2,3,4,5,6,7,8,9,10,11 or 12 C atoms and accordingly are preferably ethyl, propyl, butyl, pentyl, hexyl, heptyl, octyl, nonyl, decyl, undecyl or dodecyl, and also methyl, tridecyl, tetradecyl or pentadecyl.

If $R^1$ and/or $R^2$ in the compounds of the formulae I, II, III and IV are alkyl radicals in which, for example, one CH₂ group can also be replaced by an 0 atom (alkoxy or oxaalkyl), they can be straight-chain or branched. Preferably, they are straight-chain, have 2, 3, 4, 5, 6, 7, 8, 9, 10, 11 or 12 C atoms and accordingly are preferably ethyl, propyl, butyl, pentyl, hexyl, heptyl, octyl, nonyl, decyl, undecyl or dodecyl, ethoxy, propoxy, butoxy, pentoxy, hexoxy, heptoxy, octoxy, nonoxy, decyloxy or undecyloxy, or 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

Compounds of the formulae I, II, III and IV with branched wing groups may sometimes be important because of higher solubility in the usual liquid-crystalline base materials, in particular as chiral doping materials if they are optically active. Branched chains of this type contain as a rule not more than one chain branching, but multiple branching is possible.

Preferred branched radicals $R^1$ and $R^2$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methyloctoxy, 6-methyloctanoyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl and 2-methyl-oxahexyl.

If the compounds of the formulae I, II, III and IV contain an asymmetric C atom, these formulae comprise racemates and also optically active enantiomers and enantiomer mixtures.

A smaller group of particularly preferred compounds of the formulae II, III or IV is that of the following formulae 14–43:

| | |
|---|---|
| Alkyl—Cy—COO—Phe—CH$_2$CH$_2$—R$_F$ | 14 |
| Alkyl—Cy—Cy—CH$_2$CH$_2$—R$_F$ | 15 |
| Alkyl—Cy—Cy—R$_F$ | 16 |
| Alkyl—Cy—Cy—CH$_2$CH$_2$—Phe—CH$_2$CH$_2$—R$_F$ | 17 |
| Alkyl—Cy—Cy—Phe—CH$_2$CH$_2$—R$_F$ | 18 |
| Alkyl—Cy—Cy—COO—Phe—R$_F$ | 19 |
| Alkyl—Cy—COO—Phe—R$_F$ | 20 |
| Alkyl—Cy—COO—Phe—OR$_F$ | 21 |
| Alkyl—Cy—Cy—COO—Phe—OR$_F$ | 22 |
| Alkyl—Cy—Cy—CH$_2$CH$_2$—Phe—OR$_F$ | 23 |
| Alkyl—Cy—CH$_2$CH$_2$—Phe—OR$_F$ | 24 |
| Alkyl—Cy—Cy—Phe—OR$_F$ | 25 |
| Alkyl—Cy—CH$_2$CH$_2$—Cy—Phe—OR$_F$ | 26 |
| Alkyl—Cy—Cy—CH$_2$CH$_2$—Phe—R$_F$ | 27 |
| Alkyl—Cy—Cy—Phe—R$_F$ | 28 |
| Alkyl—Cy—Cy—Phe—CO—R$_F$ | 29 |
| Alkyl—Cy—CH$_2$CH$_2$—Phe—CO—R$_F$ | 30 |
| Alkyl—Cy—Cy—CH$_2$CH$_2$—Phe—CO—R$_F$ | 31 |
| Alkyl—Cy—CH$_2$CH$_2$—Cy—Phe—CO—R$_F$ | 32 |
| Alkyl—Cy—Cy—COO—Phe—R$_F$ | 33 |
| Alkyl—Pyr—Phe—CH=CH—COOCH$_2$—R$_F$ | 34 |
| Alkyl—Cy—Phe—OR$_F$ | 35 |
| R$_F$—Cy—Phe—Alkyl | 36 |
| R$_F$—Cy—Phe—Alkoxy | 37 |
| Alkyl—Cy—Phe—CH=CH—R$_F$ | 38 |
| Alkyl—Pyr—Phe—CH=CH—R$_F$ | 39 |
| Alkyl—Cy—Phe—CH$_2$CH$_2$—R$_F$ | 40 |
| Alkyl—Pyd—Phe—CH$_2$CH$_2$—R$_F$ | 41 |
| Alkyl—Pyr—Phe—OR$_F$ | 42 |
| Alkyl—Cy—Phe—CO—R$_F$ | 43 |

R$_F$ here has the meaning given.

The novel compounds of the formulae II, III and IV are all prepared by methods known per se, such as are described in the literature (for example in the standard works such as Houben-Weyl, Methoden der Organischen Chemie [Methods of organic chemistry], Georg Thieme Verlag, Stuttgart, or in Synthesis of Fluoroorganic Compounds, edited by I. L. Knunyants and G. G. Jakobsen, Springer Verlag, 1985), and in particular under reaction conditions which are known and suitable for the said reactions. It is also possible here to utilize variants which are known per se and not mentioned here in more detail.

Thus, fluorine compounds of the formulae I, II, III and IV can be prepared, for example, by reacting corresponding hydroxy compounds in an autoclave under pressure with tetrafluoroethene in the presence of dioxane, sodium and DMF.

Another possibility is, in a corresponding compound of the formula I, II, III or IV, in which Br takes the place of R$^2$, to exchange the Br atom for a —CO—R$_F$ radical by reaction with butyllithium and an alkyl perfluoroalkane carboxylate at low temperatures. If required, the carbonyl group can then be converted into a CF$_2$ group by means of diethylaminosulfur trifluoride.

In a further possible method of preparation, corresponding hydroxy compounds are esterified with trifluoroacetic acid and then converted to an —OR$_F$ group by means of sulfur tetrafluoride and hydrofluoric acid.

Further possible preparation methods can be taken by a person skilled in the art from the quoted literature or from the examples which follow.

The liquid-crystalline phases according to the invention consist of 2 to 25, preferably 3 to 15 components which include at least one compound of the formulae I, II, III or IV. The other constituents are preferably selected from the nematic or nematogenic substances, in particular the known substances, from the series of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbenzenes, 4,4'-bis-cyclohexylbiphenyls, phenyl- or cyclohexylpyrimidines, phenyl- or cyclohexyldioxanes, phenyl- or cyclohexyl-1,3-dithianes, 1,2-biscyclohexylethanes, 1,2-bis-phenylethanes, 1-phenyl-2-cyclohexylethanes, optionally halogenated stilbenes, benzyl phenyl ethers, tolanes and substituted cinnamic acids.

The most important compounds which can be used as constituents of such liquid-crystalline phases can be characterized by the formula V $$R'—L—G—E—R''  \qquad V$$

wherein L and E each are a carbocyclic or heterocyclic ring system from the group comprising 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| | |
|---|---|
| —CH=CH— | —N(O)=N— |
| —CH=CY— | —CH=N(O)— |
| —C≡C— | —CH$_2$—CH$_2$— |
| —CO—O— | —CH$_2$—O— |
| —CO—S— | —CH$_2$—S— |
| —CH=N— | —COO—Phe—COO— | or a C—C single bond, Y is halogen, preferably chlorine, or —CN, and R' and R" are alkyl, alkoxy, alkanoyloxy or alkoxycarbonyloxy having up to 18, preferably up to 8, carbon atoms, or one of these radicals can also be CN, NC, NO$_2$, CF$_3$, F, Cl or Br.

In most of these compounds, R' and R" are different, one of these radicals being in most cases an alkyl group or alkoxy group. However, other variants of the envisaged substituents are also usual. Many such substances or even mixtures thereof are commercially available. All of these substances can be prepared by methods known from the literature.

The phases according to the invention contain about 0.1 to 99%, preferably 10 to 95%, of one or more compounds of the formula I. Dielectrics according to the invention, which contain 0.1 to 40%, preferably 0.5 to 30%, of one or more compounds of the formulae I, II, III and/or IV, are also preferred.

Compounds of a formulae I, II, III, and IV with an optically active wing group are suitable as components of nematic liquid-crystalline phases for avoiding reverse twist and for improving the elastic constants.

Optically active compounds of the formulae I, II, III and IV, are also suitable as components of chirally tilted smectic liquid-crystalline phases.

In addition to chiral compounds of the formulae I, II, III or IV, these phases contain, in the achiral base mixture, at least one component which shows negative anisotropy or a small amount of positive dielectric anisotropy.

Compounds containing the structural element A, B or C are suitable as further components showing negative dielectric anisotropy.

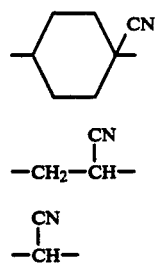

Preferred compounds of this type are of the formulae VIa, VIb and VIc:

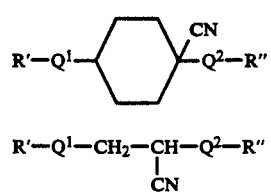

R'—Q$^3$—Q$^4$—R"      VI c

R' and R" each are preferably straight-chain alkyl or alkoxy groups each having 2 to 10 C atoms. Q$^1$ and Q$^2$ each are 1,4-phenylene, trans-1,4-cyclohexylene, 4,4'-biphenylyl, 4-(trans-4-cyclohexyl)-phenyl or trans, trans-4,4'-bicyclohexyl, or one of the groups Q$^1$ and Q$^2$ are also a single bond.

Q$^3$ and Q$^4$ each are 1,4-phenylene, 4,4'-biphenylyl or trans-1,4-cyclohexylene. One of the groups Q$^3$ and Q$^4$ can also be 1,4-phenylene in which at least one CH group is replaced by N. R'" is an optically active radical with an asymmetric carbon atom of the structure

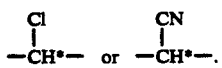

Particularly preferred compounds Q of the formula VI c are those of the formula VI c':

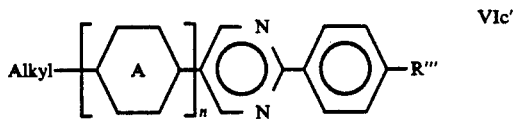

Wherein A is 1,4-phenylene or trans-1,4-cyclohexylene and n is 0 or 1.

The dielectrics according to the invention are prepared in a conventional manner per se. As a rule, the components are dissolved in one another, advantageously at elevated temperature.

The liquid-crystalline dielectrics according to the invention can be modified by suitable additives in such a way that they can be used in all hitherto disclosed types of liquid crystal display elements.

Such additives are known to those skilled in the art and are extensively described in the literature. For example, it is possible to add conductivity salts, preferably ethyl-dimethyl-dodecyl-ammonium 4-hexyloxybenzoate, tetrabutylammonium tetraphenylboranate or complex salts of crown ethers (compare, e.g., I. Haller et al., Mol. Cryst. Liq. Cryst. Volume 24, pages 249–258 (1973)), for improving the conductivity, dichroic dyes for the preparation of coloured Guest-Host systems or substances for altering the dielectric anisotropy, the viscosity and/or the orientation of the nematic phases. Such substances are described, for example, in German Offenlegungsschriften 2,209,127, 2,240,864, 2,321,632, 2,338,281, 2,450,088, 2,637,430, 2,853,728 and 2,902,177.

The examples which follow are intended to explain the invention, without restricting it. m.p.=melting point, c.p.=clear point. Percentage data in the preceding and following text are percent by weight; all temperature data are given in degrees Celsius. "Working-up in the usual way" means: water is added, the mixture is extracted with methylene chloride and separated, the organic phase is dried and evaporated and the product is purified by crystallization, distillation and/or chromatography.

EXAMPLE 1

43.7 g of the known 4-(trans-4-propylcyclohexyl)-phenol are dissolved in 80 ml of anhydrous dioxane, and 1.2 g of sodium (as a 50% suspension in xylene) are added under a dry atmosphere. After stirring for 3 hours, 40 ml of anhydrous dimethylformamide are added and the mixture is transferred into an autoclave which is flushed several times with nitrogen and then with tetrafluoroethene from a stock gas cylinder. The tetrafluoroethene pressure is raised to 2.7 bar, the feed to the gas cylinder is interrupted, and the autoclave is intensively shaken. As soon as the pressure has fallen to 2.0 bar, it is raised again to 2.7 bar. This is continued until the reaction stops. The contents of the autoclave are stirred into 500 ml of a 10% sodium hydroxide solution. The mixture is extracted several times with dichloromethane. After washing with water, the organic phase is freed of solvent by distillation. The residue is subjected to separation by column chromatography (silica gel/toluene). After removal of the solvent, the main fraction is distilled in a bulb tube. This gives 4-(trans-4-propylcyclohexyl)-1-(1,1,2,2-tetrafluoroethoxy)-benzene m.p. 6° (c.P. −20°).

The following are prepared analogously: 4-(trans-4-Methyl-cyclohexyl)-1-(1,1,2,2-tetrafluoroethoxy)-benzene
4-(trans-4-Ethyl-cyclohexyl-1-(1,1,2,2-tetrafluoroethoxy)benzene
4-(trans-4-Butyl-cyclohexyl-1-(1,1,2,2-tetrafluoroethoxy)benzene
4-(trans-4-Pentyl-cyclohexyl-1-(1,1,2,2-tetrafluoroethoxy)benzene
4-(trans-3-Hexyl-cyclohexyl-1-(1,1,2,2-tetrafluoroethoxy)benzene
4-(trans-4-Heptyl-cyclohexyl-1-(1,1,2,2-tetrafluoroethoxy)benzene
4-(trans-4-Octyl-cyclohexyl-1-(1,1,2,2-tetrafluoroethoxy)benzene
4-(trans-4-Nonyl-cyclohexyl-1-(1,1,2,2-tetrafluoroethoxy)benzene
4-(trans-4-Decyl-cyclohexyl-1-(1,1,2,2-tetrafluoroethoxy)benzene
4-Methyl-1-(1,1,2,2-tetrafluoroethoxy)-benzene
4-Ethyl-1-(1,1,2,2-tetrafluoroethoxy)-benzene
4-Butyl-1-(1,1,2,2-tetrafluoroethoxy)-benzene
4-Pentyl-1-(1,1,2-2-tetrafluoroethoxy)-benzene
4-Hexyl-1-(1,1,2,2-tetrafluoroethoxy)-benzene
4-Heptyl-1-(1,1,2,2-tetrafluoroethoxy)-benzene
4-Octyl-1-(1,1,2,2-tetrafluoroethoxy)-benzene
4-Nonyl-1-(1,1,2-2-tetrafluoroethoxy)-benzene
4-Decyl-1-(1,1,2,2-tetrafluoroethoxy)-benzene

EXAMPLE 2

11.1 g of 4-(trans-4-propylcyclohexyl)-cyclohexanone dissolved in 20 ml of diethyl ether are added dropwise at −35° to a suspension of 23.5 g of perfluorohexylmagnesium iodide in 100 ml of diethyl ether. After 2 hours, the mixture is worked up in the usual way and the resulting 1-perfluorohexyl-4-(trans-4-propylcyclohexyl)cyclohexanol is dissolved in 40 ml of dichloromethane and 16 ml of pyridine. This solution is added dropwise at 0° with stirring to a solution of 2.6 ml of diethylaminosulfur trifluoride in 40 ml of dichloromethane.

After 1 hour, the mixture is worked up in the usual way and the crude product is dissolved in toluene, and the solution is filtered over silica gel and evaporated to dryness. The residue is dissolved in glacial acetic acid, hydrogenated at normal pressure and room temperature in the presence of Pt catalyst and worked up in the usual way. After further purification by chromatography and fractional crystallization, this gives trans, trans-4-perfluorohexyl-4'-propylcyclohexylcyclohexane, m.p. 48° (c.p. −30°).

The following are prepared analogously:
trans,trans-4-Perfluorohexyl-4'-ethylcyclohexylcyclohexane
trans-trans-4-Perfluorohexyl-4'-butylcyclohexylcyclohexane
trans-trans-4-Perfluorohexyl-4'-pentylcyclohexylcyclohexane
trans,trans-4-Perfluorohexyl-4'-heptylcyclohexylcyclohexane
trans,trans-4-Perfluorobutyl-4'-ethylcyclohexylcyclohexane
trans,trans-4-Perfluorobutyl-4'-propylcyclohexylcyclohexane
trans,trans-4-Perfluorobutyl-4'-butylcyclohexylcyclohexane
trans,trans-4-Perfluorobutyl-4'-pentylcyclohexylcyclohexane
trans,trans-4-Perfluorobutyl-4'-heptylcyclohexylcyclohexane
trans,trans-4-Perfluoroethyl-4'-ethylcyclohexylcyclohexane
trans,trans-4-Perfluoroethyl-4'-propylcyclohexylcyclohexane
trans,trans-4-Perfluoroethyl-4'-butylcyclohexylcyclohexane
trans,trans-4-Perfluoroethyl-4'-pentylcyclohexylcyclohexane
trans-trans-4-Perfluoroethyl-4'-heptylcyclohexylcyclohexane
4-(trans-4-Perfluoroethylcyclohexyl)-1-ethylbenzene
4-(trans-4-Perfluoroethylcyclohexyl)-1-propylbenzene
4-(trans-4-Perfluoroethylcyclohexyl)-1-butylbenzene
4-(trans-4-Perfluoroethylcyclohexyl)-1-pentylbenzene
4-(trans-4-Perfluoroethylcyclohexyl)-1-heptylbenzene
4-(trans-4-Perfluoroethylcyclohexyl)-1-methoxybenzene
4-(trans-4-Perfluoroethylcyclohexyl)-1-ethoxybenzene
4-(trans-4-Perfluoroethylcyclohexyl)-1-propoxybenzene
4-(trans-4-Perfluoroethylcyclohexyl)-1-butoxybenzene
4-(trans-4-Perfluoroethylcyclohexyl)-1-pentoxybenzene
4-(trans-4-Perfluoroethylcyclohexyl)-1-hexoxybenzene
4-(trans-4-Perfluoroethylcyclohexyl)-1-octoxybenzene
4-(trans-4-Perfluorobutylcyclohexyl)-1-ethylbenzene
4-(trans-4-Perfluorobutylcyclohexyl)-1-propylbenzene
4-(trans-4-Perfluorobutylcyclohexyl)-1-butylbenzene
4-(trans-4-Perfluorobutylcyclohexyl)-1-pentylbenzene
4-(trans-4-Perfluorobutylcyclohexyl)-1-heptylbenzene
4-(trans-4-Perfluorobutylcyclohexyl)-1-methoxybenzene
4-(trans-4-Perfluorobutylcyclohexyl)-1-ethoxybenzene
4-(trans-4-Perfluorobutylcyclohexyl)-1-propoxybenzene
4-(trans-4-Perfluorobutylcyclohexyl)-1-butoxybenzene
4-(trans-4-Perfluorobutylcyclohexyl)-1-pentoxybenzene
4-(trans-4-Perfluorobutylcyclohexyl)-1-hexoxybenzene
4-(trans-4-Perfluorobutylcyclohexyl)-1-octoxybenzene
4-(trans-4-Perfluorohexylcyclohexyl)-1-ethylbenzene
4-(trans-4-Perfluorohexylcyclohexyl)-1-propylbenzene
4-(trans-4-Perfluorohexylcyclohexyl)-1-butylbenzene
4-(trans-4-Perfluorohexylcyclohexyl)-1-pentylbenzene
4-(trans-4-Perfluorohexylcyclohexyl)-1-heptylbenzene
4-(trans-4-Perfluorohexylcyclohexyl)-1-methoxybenzene 4-(trans-4-Perfluorohexylcyclohexyl)-1-ethoxybenzene
4-(trans-4-Perfluorohexylcyclohexyl)-1-propoxybenzene
4-(trans-4-Perfluorohexylcyclohexyl)-1-butoxybenzene
4-(trans-4-Perfluorohexylcyclohexyl)-1-pentoxybenzene
4-(trans-4-Perfluorohexylcyclohexyl)-1-hexoxybenzene
4-(trans-4-Perfluorohexylcyclohexyl)-1-octoxybenzene
4-(trans-Perfluorooctylcyclohexyl)-1-ethylbenzene
4-(trans-Perfluorooctylcyclohexyl)-1-propylbenzene
4-(trans-Perfluorooctylcyclohexyl)-1-butylbenzene
4-(trans-Perfluorooctylcyclohexyl)-1-pentylbenzene
4-(trans-Perfluorooctylcyclohexyl)-1-heptylbenzene
4-(trans-Perfluorooctylcyclohexyl)-1-methoxybenzene
4-(trans-Perfluorooctylcyclohexyl)-1-ethoxybenzene
4-(trans-Perfluorooctylcyclohexyl)-1-propoxybenzene
4-(trans-Perfluorooctylcyclohexyl)-1-butoxybenzene
4-(trans-Perfluorooctylcyclohexyl)-1-pentoxybenzene
4-(trans-Perfluorooctylcyclohexyl)-1-hexoxybenzene
4-(trans-Perfluorooctylcyclohexyl)-1-octoxybenzene
4-(trans-4-Perfluorodecylcyclohexyl)-1-ethylbenzene
4-(trans-4-Perfluorodecylcyclohexyl)-1-propylbenzene
4-(trans-4-Perfluorodecylcyclohexyl)-1-butylbenzene
4-(trans-4-Perfluorodecylcyclohexyl)-1-pentylbenzene
4-(trans-4-Perfluorodecylcyclohexyl)-1-heptylbenzene
4-(trans-4-Perfluorodecylcyclohexyl)-1-methoxybenzene
4-(trans-4-Perfluorodecylcyclohexyl)-1-ethoxybenzene
4-(trans-4-Perfluorodecylcyclohexyl)-1-propoxybenzene
4-(trans-4-Perfluorodecylcyclohexyl)-1-butoxybenzene
4-(trans-4-Perfluorodecylcyclohexyl)-1-pentoxybenzene
4-(trans-4-Perfluorodecylcyclohexyl)-1-hexoxybenzene
4-(trans-4-Perfluorodecylcyclohexyl)-1-octoxybenzene

EXAMPLE 3

A mixture of 10 g of r-1-cyano-cis-4-(p-bromophenyl)-1-butylcyclohexane, 13 ml of perfluorohexylethylene, 3.5 ml of triethylamine, 50 ml of acetonitrile, 0.1 g of Pd(II) acetate and 0.25 g of tri-o-tolylphosphine is heated under reflux for 72 hours. After cooling to 0°, the resulting crystals are filtered off with suction, washed with acetonitrile and water and recrystallized from acetonitrile. This gives E-1-perfluorohexyl-2-[p-(4-cyano-4-butylcyclohexyl)-phenyl]-ethene, m.p. 117°.

The following are prepared analogously:
E-1-Perfluorohexyl-2-[p-(trans-4-propylcyclohexyl)-phenyl]ethene, m.p. 45°
E-1-Perfluorohexyl-2-[p-(5-propylpyrimidin-2-yl)-phenyl]ethene, m.p. 105°, c.p. 140°
E-1-Perfluorohexyl-2-[p-(5-heptylpyrimidin-2-yl)-phenyl]ethene, m.p. 77°, c.p. 113°

EXAMPLE 4

Hydrogenation of 2.3 g of E-1-perfluorohexyl-2-[p-(4-cyano-4-butylcyclohexyl)-phenyl]-ethene (Example 3) in 50 ml of tetrahydrofuran over 1 g of Pd/C (5%) and recrystallization of the resulting crude product from ethanol gives 1-perfluorohexyl-2-[p-(4-cyano-4-butylcyclohexyl)-phenyl]-ethane, m.p. 71°.

The following are prepared analogously:
1-Perfluorohexyl-2-[p-(trans-4-propylcyclohexyl)-phenyl]ethane, m.p. 41°
1-Perfluorohexyl-2-[p-(5-propylpyrimidin-2-yl)-phenyl]ethane m.p. 69°, c.p. 137°

EXAMPLE 5

38.7 g of the known 4-(5-heptylpyrimidin-2-yl)phenol are dissolved in 60 ml of anhydrous dioxane, and 0.9 g of sodium (as a 50% suspension in xylene) is added under a dry atmosphere. After stirring for 3 hours, 20 ml of anhydrous dimethylformamide are added and the mixture is transferred into an autoclave which is flushed several times with nitrogen and then with tetrafluoroethene from a stock gas cylinder. The tetrafluoroethene pressure is raised to 2.7 bar, the feed to the gas cylinder is interrupted and the autoclave is intensively shaken. As soon as the pressure has fallen to 2.0 bar, it is raised again to 2.7 bar. This is continued until the reaction stops. The contents of the autoclave are stirred into 500 ml of 10% sodium hydroxide solution. The mixture is extracted several times with dichloromethane. After washing with water, the organic phase is freed of solvent by distillation. The residue is subjected to separation by column chromatography (silica gel/dichloromethane). After removal of the solvent, the main fraction is recrystallized from ethanol. This gives 4-(5-heptylpyrimidin-2-yl)-1-(1,1,2,2-tetrafluoroethoxy)-benzene, m.p. 46° (c.p. 43°).

The following are prepared analogously:
4-(5-Ethylpyrimidin-2-yl)-1-(1,1,2,2-tetrafluoroethoxy)-benzene
4-(5-Propylpyrimidin-2-yl)-1-(1,1,2,2-tetrafluoroethoxy)benzene
4-(5-Butylpyrimidin-2-yl)-1-(1,1,2,2-tetrafluoroethoxy)-benzene
4-(5-Pentylpyrimidin-2-yl)-1-(1,1,2,2-tetrafluoroethoxy)benzene
4-(5-Hexylpyrimidin-2-yl)-1-(1,1,2,2-tetrafluoroethoxy)benzene
4-(5-Octylpyrimidin-2-yl)-1-(1,1,2,2-tetrafluoroethoxy)-benzene
4-(5-Nonylpyrimidin-2-yl)-1-(1,1,2,2-tetrafluoroethoxy)benzene
4-(5-Decylpyrimidin-2-yl)-1-(1,1,2,2-tetrafluoroethoxy)benzene

EXAMPLE 6

A mixture if 11.9 g of p-(trans-4-propylcyclohexyl)-trifluoroacetophenone [obtainable by reacting p-(trans-4-propylcyclohexyl)-bromobenzene with methyl trifluoroacetate in the presence of butyllithium] and 10.5 ml of diethylaminosulfur trifluoride is stirred for 7 days at 65°. After usual working-up, this gives trans-1-p-perfluoroethylphenyl-4-propylcyclohexane, m.p. 18°, $\Delta\epsilon 3.9$.

The following are prepared analogously:
trans-1-p-Perfluoroethylphenyl-4-ethylcyclohexane
trans-1-p-Perfluoroethylphenyl-4-butylcyclohexane
trans-1-p-Perfluoroethylphenyl-4-pentylcyclohexane
trans-1-p-Perfluoroethylphenyl-4-heptylcyclohexane

EXAMPLE 7

A liquid-crystalline dielectric consisting of
24% of p-(trans-4-propylcyclohexyl)-benzonitrile,
36% of p-(trans-4-pentylcyclohexyl)-benzonitrile,
25% of p-(trans-4-heptylcyclohexyl)-benzonitrile and
15% of 4-cyano-4'-(trans-4-pentylcyclohexyl)-biphenyl
has a viscosity of 27 mPa.s at 20°. The viscosity values at 20° after the addition of in each case 10% of the compounds A-D according to the invention to the above base mixture are shown in the following table:

| Addition of 10% of the compound according to the invention | A | B | C | D |
|---|---|---|---|---|
| Viscosity in mPa.s at 20° | 25 | 26 | 22 | 26 |

A: trans-1-p-Perfluoroethylphenyl-4-propylcyclohexane
B: trans,trans-4-Perfluorohexyl-4'-propylcyclohexyl-cyclohexane
C: 4-(trans-4-Propylcyclohexyl-1-)1,1,2,2-tetrafluoro-ethoxy)-benzene
D: 1-Perfluorohexyl-2-[p-(5-propylpyrimidin-2-yl)-phenyl]-ethane

EXAMPLE 8

10. 0 g of the known ethyl pentadecafluorooctanoate and 1.4 g of acetone as a mixture are added, with exclusion of moisture, to 1.6 of freshly prepared sodium methanolate and the resulting suspension is stirred for 24 hours at room temperature. 2 N hydrochloric acid is then added until the mixture shows a neutral reaction. After extraction with three times 30 ml of diethyl ether, the combined organic phases are washed with 30 ml of water. The solution is dried with sodium sulfate, the solvent is evaporated and the residue is distilled at 30 mm Hg in a bulb tube. 7.7 g of 5,5,6,6,7,7,8,8,9,9,10,10,11,11,11-pentadecafluoroundecane-2,4-dione pass over at 140°–150° C.

EXAMPLE 9

A liquid-crystalline dielectric containing
23% of p-trans-4-propylcyclohexylbenzonitrile,
34% of p-trans-4-pentylcyclohexylbenzonitrile,
24% of p-trans-4-heptylcyclohexylbenzonitrile,
14% of 4-cyano-4'-(trans-4-pentylcyclohexyl)biphenyl and
5% of 5,5,6,6,7,7,8,8,9,9,10,10,11,11,11-pentadecafluoroundecane-2,4-dione
is prepared.

EXAMPLE 10

0.1 mol of 1-trans-4-(trans-4-propylcyclohexyl)cyclohexyl]-2-(p-trifluoromethylcarbonyloxyphenyl)-ethane (obtainable by esterification of trifluoroacetic acid with the corresponding hydroxy compound), 25.0 g of sulfur tetrafluoride and 3.5 g of anhydrous hydrofluoric acid are heated in an autoclave for 3 hours at 150° and then for 12 hours at 175°. The mixture is then hydrolyzed under alkaline conditions and worked up in the usual way. After purification, this gives 1-[trans-4-(trans-4-propylcyclohexyl)-cyclohexyl]-2-(p-pentafluoroethoxyphenyl)-ethane.

The following are prepared analogously:
1-[trans-4-(trans-4-Methylcyclohexyl)cyclohexyl]-2-(p-pentafluoroethoxyphenyl)-ethane
1-[trans-4-(trans-4-Ethylcyclohexyl)cyclohexyl]-2-(p-pentafluoroethoxyphenyl)-ethane
1-[trans-4-(trans-4-Butylcyclohexyl)cyclohexyl]-2-(p-pentafluoroethoxyphenyl)-ethane
1-[trans-4-(trans-4-Pentylcyclohexyl)cyclohexyl]-2-(p-pentafluoroethoxyphenyl)-ethane
1-[trans-4-(trans-4-Hexylcyclohexyl)cyclohexyl]-2-(p-pentafluoroethoxyphenyl)-ethane
1-[trans-4-(trans-4-Heptylcyclohexyl)cyclohexyl]-2-(p-pentafluoroethoxyphenyl)-ethane
1-(trans-4-Methylcyclohexyl)-2-(p-pentafluoroethoxyphenyl)-ethane
1-(trans-4-Ethylcyclohexyl)-2-(p-pentafluoroethoxyphenyl)-ethane
1-(trans-4-Propylcyclohexyl)-2-(p-pentafluoroethoxyphenyl)-ethane
1-(trans-4-Butylcyclohexyl)-2-(p-pentafluoroethoxyphenyl)-ethane
1-trans-4-Pentylcyclohexyl)-2-(p-pentafluoroethoxyphenyl)-ethane
1-(trans-4-Hexylcyclohexyl)-2-(p-pentafluoroethoxyphenyl)-ethane
1-(trans-4-Heptylcyclohexyl)-2-(p-pentafluoroethoxyphenyl)-ethane
p-[trans-4-(trans-4-Methylcyclohexyl)cyclohexyl]pentafluoroethoxybenzene
p-[trans-4-(trans-4-Ethylcyclohexyl)cyclohexyl]pentafluoroethoxybenzene
p-[trans-4-(trans-4-Propylcyclohexyl)cyclohexyl]pentafluoroethoxybenzene
p-[trans-4-(trans-4-Butylcyclohexyl)cyclohexyl]pentafluoroethoxybenzene
p-[trans-4-(trans-4-Pentylcyclohexyl)cyclohexyl]pentafluoroethoxybenzene
p-[trans-4-(trans-4-Hexylcyclohexyl)cyclohexyl]pentafluoroethoxybenzene
p-[trans-4-(trans-4-Heptylcyclohexyl)cyclohexyl]pentafluoroethoxybenzene
1-(trans-4-Methylcyclohexyl)-2-[trans-4-(p-pentafluoroethoxyphenyl)cyclohexyl)-ethane
1-(trans-4-Ethylcyclohexyl)-2-[trans-4-(p-pentafluoroethoxyphenyl)cyclohexyl)-ethane
1-(trans-4-Propylcyclohexyl)-2-[trans-4-(p-pentafluoroethoxyphenyl)cyclohexyl)-ethane
1-(trans-4-Butylcyclohexyl)-2-[trans-4-(p-pentafluoroethoxyphenyl)cyclohexyl)-ethane
1-(trans-4-Pentylcyclohexyl)-2-[trans-4-(p-pentafluoroethoxyphenyl)cyclohexyl)-ethane
1-(trans-4-Hexylcyclohexyl)-2-[trans-4-(p-pentafluoroethoxyphenyl)cyclohexyl)-ethane
1-(trans-4-Heptylcyclohexyl)-2-[trans-4-(p-pentafluoroethoxyphenyl)cyclohexyl)-ethane

EXAMPLE 11

0.1 mol of a solution of n-butyllithium in hexane and then 0.1 mol of ethyl perfluorononanoate are added with stirring at −78° to a mixture of 0.1 mol of 4-[trans-4-(trans-4-propylcyclohexyl)-cyclohexyl]-bromobenzene, 150 ml of diethyl ether and 150 ml of tetrahydrofuran. After working up in the usual way, this gives 4-[trans-4-(trans-4-propylcyclohexyl)cyclohexyl]phenyl perfluorooctyl ketone.

The following are prepared analogously:
4-[trans-4-(trans-4-Methylcyclohexyl)cyclohexyl]phenyl perfluorooctyl ketone
4-[trans-4-(trans-4-Ethylcyclohexyl)cyclohexyl]phenyl perfluorooctyl ketone
4-[trans-4-(trans-4-Butylcyclohexyl)cyclohexyl]phenyl perfluorooctyl ketone
4-[trans-4-(trans-4-Pentylcyclohexyl)cyclohexyl]phenyl perfluorooctyl ketone
4-[trans-4-(trans-4-Hexylcyclohexyl)cyclohexyl]phenyl perfluorooctyl ketone
4-[trans-4-(trans-4-Heptylcyclohexyl)cyclohexyl]phenyl perfluorooctyl ketone
4-[trans-4-(trans-4-Methylcyclohexyl)cyclohexyl]phenyl perfluoroheptylketone
4-[trans-4-(trans-4-Ethylcyclohexyl)cyclohexyl]phenyl perfluoroheptyl ketone
4-[trans-4-(trans-4-Propylcyclohexyl)cyclohexyl]phenyl perfluoroheptyl ketone 4-[trans-4-(trans-4-Butylcyclohexyl)cyclohexyl]phenyl perfluoroheptyl ketone
4-[trans-4-(trans-4-Pentylcyclohexyl)cyclohexyl]phenyl perfluoroheptyl ketone
4-[trans-4-(trans-4-Hexylcyclohexyl)cyclohexyl]-phenyl perfluoroheptyl ketone
4-[trans-4-(trans-4-Heptylcyclohexyl)cyclohexyl]-phenyl perfluoroheptyl ketone
1-(trans-4-Methylcyclohexyl)-2-(4-perfluorooctyl-carbonylphenyl)-ethane
1-(trans-4-Ethylcyclohexyl)-2-(4-perfluorooctyl-carbonylphenyl)-ethane
1-(trans-4-Propylcyclohexyl)-2-(4-perfluorooctyl-carbonylphenyl)-ethane
1-(trans-4-Butylcyclohexyl)-2-(4-perfluorooctyl-carbonylphenyl)-ethane
1-(trans-4-Pentylcyclohexyl)-2-(4-perfluorooctyl-carbonylphenyl)-ethane
1-(trans-4-Hexylcyclohexyl)-2-(4-perfluorooctyl-carbonylphenyl)-ethane
1-(trans-4-Heptylcyclohexyl)-2-(4-perfluorooctyl-carbonylphenyl)-ethane
1-(trans-4-Methylcyclohexyl)-2-(4-perfluoroheptyl-carbonylphenyl)-ethane
1-(trans-4-Ethylcyclohexyl)-2-(4-perfluoroheptyl-carbonylphenyl)-ethane
1-(trans-4-Propylcyclohexyl)-2-(4-perfluoroheptyl-carbonylphenyl)-ethane
1-(trans-4-Butylcyclohexyl)-2-(4-perfluoroheptyl-carbonylphenyl)-ethane
1-(trans-4-Pentylcyclohexyl)-2-(4-perfluoroheptyl-carbonylphenyl)-ethane
1-(trans-4-Hexylcyclohexyl)-2-(4-perfluoroheptyl-carbonylphenyl)-ethane
1-(trans-4-Heptylcyclohexyl)-2-(4-perfluoroheptyl-carbonylphenyl)-ethane
1-[trans-4-(trans-4-Methylcyclohexyl)cyclohexyl]-2-(4-perfluorooctylcarbonylphenyl)-ethane
1-[trans-4-(trans-4-Ethylcyclohexyl)cyclohexyl]-2-(4-perfluorooctylcarbonylphenyl)-ethane
1-[trans-4-(trans-4-Propylcyclohexyl)cyclohexyl]-2-(4-perfluorooctylcarbonylphenyl)-ethane
1-[trans-4-(trans-4-Butylcyclohexyl)cyclohexyl]-2-(4-perfluorooctylcarbonylphenyl)-ethane
1-[trans-4-(trans-4-Pentylcyclohexyl)cyclohexyl]-2-(4-perfluorooctylcarbonylphenyl)-ethane
1-[trans-4-(trans-4-Hexylcyclohexyl)cyclohexyl]-2-(4-perfluorooctylcarbonylphenyl)-ethane
1-[trans-4-(trans-4-Heptylcyclohexyl)cyclohexyl]-2-(4-perfluorooctylcarbonylphenyl)-ethane
1-[trans-4-(trans-4-Methylcyclohexyl)cyclohexyl]-2-(4-perfluoroheptylcarbonylphenyl)-ethane
1-[trans-4-(trans-4-Ethylcyclohexyl)cyclohexyl]-2-(4-perfluoroheptylcarbonylphenyl)-ethane
1-[trans-4-(trans-4-Propylcyclohexyl)cyclohexyl]-2-(4-perfluoroheptylcarbonylphenyl)-ethane
1-[trans-4-(trans-4-Butylcyclohexyl)cyclohexyl]-2-(4-perfluoroheptylcarbonylphenyl)-ethane
1-[trans-4-(trans-4-Pentylcyclohexyl)cyclohexyl]-2-(4-perfluoroheptylcarbonylphenyl)-ethane
1-[trans-4-(trans-4-Hexylcyclohexyl)cyclohexyl]-2-(4-perfluoroheptylcarbonylphenyl)-ethane
1-[trans-4-(trans-4-Heptylcyclohexyl)cyclohexyl]-2-(4-perfluoroheptylcarbonylphenyl)-ethane
1-(trans-4-Methylcyclohexyl)-2-[trans-4-(4-perfluorooctylcarbonylphenyl)cyclohexyl]-ethane
1-(trans-4-Ethylcyclohexyl)-2-[trans-4-(4-perfluorooctylcarbonylphenyl)cyclohexyl]-ethane
1-(trans-4-Propylcyclohexyl)-2-[trans-4-(4-perfluorooctylcarbonylphenyl)cyclohexyl]-ethane
1-(trans-4-Butylcyclohexyl)-2-[trans-4-(4-perfluorooctylcarbonylphenyl)cyclohexyl]-ethane
1-(trans-4-Pentylcyclohexyl)-2-[trans-4-(4-perfluorooctylcarbonylphenyl)cyclohexyl]-ethane
1-(trans-4-Hexylcyclohexyl)-2-[trans-4-(4-perfluorooctylcarbonylphenyl)cyclohexyl]-ethane
1-(trans-4-Heptylcyclohexyl)-2-[trans-4-(4-perfluorooctylcarbonylphenyl)cyclohexyl]-ethane
1-(trans-4-Methylcyclohexyl)-2-[trans-4-(4-perfluoroheptylcarbonylphenyl)cyclohexyl]-ethane
1-(trans-4-Ethylcyclohexyl)-2-[trans-4-(4-perfluoroheptylcarbonylphenyl)cyclohexyl]-ethane
1-(trans-4-Propylcyclohexyl)-2-[trans-4-(4-perfluoroheptylcarbonylphenyl)cyclohexyl]-ethane
1-(trans-4-Butylcyclohexyl)-2-[trans-4-(4-perfluoroheptylcarbonylphenyl)cyclohexyl]-ethane
1-(trans-4-Pentylcyclohexyl)-2-[trans-4-(4-perfluoroheptylcarbonylphenyl)cyclohexyl]-ethane
1-(trans-4-Hexylcyclohexyl)-2-[trans-4-(4-perfluoroheptylcarbonylphenyl)cyclohexyl]-ethane
1-(trans-4-Heptylcyclohexyl)-2-[trans-4-(4-perfluoroheptylcarbonylphenyl)cyclohexyl]-ethane

EXAMPLE 12

A mixture of 0.1 mol of diethylaminosulfur trifluoride and 0.05 mol of 4-[trans-4-(trans-4-propylcyclohexyl)-cyclohexyl]-phenyl perfluorooctyl ketone (prepared according to Example 11) is stirred for 7 days at 50°. CH$_2$Cl$_2$ is then added, and the mixture is worked up in the usual way. After purification by chromatography, this gives 4-[trans-4-(trans-4-propylcyclohexyl)cyclohexyl]-perfluorononyl-benzene.

The following are prepared analogously:
4-[trans-4-(trans-4-Methylcyclohexyl)cyclohexyl]-perfluorononyl-benzene
4-[trans-4-(trans-4-Ethylcyclohexyl)cyclohexyl]-perfluorononyl-benzene
4-[trans-4-(trans-4-Butylcyclohexyl)cyclohexyl]-perfluorononyl-benzene
4-[trans-4-(trans-4-Pentylcyclohexyl)cyclohexyl]-perfluorononyl-benzene
4-[trans-4-Hexylcyclohexyl)cyclohexyl]-perfluorononyl-benzene
4-[trans-4-(trans-4-Heptylcyclohexyl)cyclohexyl]-perfluorononyl-benzene
4-[trans-4-(trans-4-Methylcyclohexyl)cyclohexyl]-perfluorooctyl-benzene
4-[trans-4-(trans-4-Ethylcyclohexyl)cyclohexyl]-perfluorooctyl-benzene
4-[trans-4-(trans-4-Propylcyclohexyl)cyclohexyl]-perfluorooctyl-benzene
4-[trans-4-(trans-4-Butylcyclohexyl)cyclohexyl]-perfluorooctyl-benzene
4-[trans-4-(trans-4-Pentylcyclohexyl)cyclohexyl]-perfluorooctyl-benzene
4-[trans-4-(trans-4-Hexylcyclohexyl)cyclohexyl]-perfluorooctyl-benzene
4-[trans-4-(trans-4-Heptylcyclohexyl)cyclohexyl]-perfluorooctyl-benzene
1-(trans-4-Methylcyclohexyl)-2-(4-perfluorononylphenyl)-ethane
1-(trans-4-Ethylcyclohexyl)-2-(4-perfluorononylphenyl)-ethane
1-(trans-4-Propylcyclohexyl)-2-(4-perfluorononylphenyl)-ethane 1-(trans-4-Butylcyclohexyl)-2-(4-perfluorononyl-phenyl)-ethane
1-(trans-4-Pentylcyclohexyl)-2-(4-perfluorononyl-phenyl)-ethane
1-(trans-4-Hexylcyclohexyl)-2-(4-perfluorononyl-phenyl)-ethane
1-(trans-4-Heptylcyclohexyl)-2-(4-perfluorononyl-phenyl)-ethane
1-(trans-4-Methylcyclohexyl)-2-(4-perfluorooctyl-phenyl)-ethane
1-(trans-4-Ethylcyclohexyl)-2-(4-perfluorooctyl-phenyl)-ethane
1-(trans-4-Propylcyclohexyl)-2-(4-perfluorooctyl-phenyl)-ethane
1-(trans-4-Butylcyclohexyl)-2-(4-perfluorooctyl-phenyl)-ethane
1-(trans-4-Pentylcyclohexyl)-2-(4-perfluorooctyl-phenyl)-ethane
1-(trans-4-Hexylcyclohexyl)-2-(4-perfluorooctyl-phenyl)-ethane
1-(trans-4-Heptylcyclohexyl)-2-(4-perfluorooctyl-phenyl)-ethane
1-[trans-4-(trans-4-Methylcyclohexyl)cyclohexyl]-2-(4-perfluorononylphenyl)-ethane
1-[trans-4-(trans-4-Ethylcyclohexyl)cyclohexyl]-2-(4-perfluorononylphenyl)-ethane
1-[trans-4-(trans-4-Propylcyclohexyl)cyclohexyl]-2-(4-perfluorononylphenyl)-ethane
1-[trans-4-(trans-4-Butylcyclohexyl)cyclohexyl]-2-(4-perfluorononylphenyl)-ethane
1-[trans-4-(trans-4-Pentylcyclohexyl)cyclohexyl]-2-(4-perfluorononylphenyl)-ethane
1-[trans-4-(trans-4-Hexylcyclohexyl)cyclohexyl]-2-(4-perfluorononylphenyl)-ethane
1-[trans-4-(trans-4-Heptylcyclohexyl)cyclohexyl]-2-(4-perfluorononylphenyl)-ethane
1-[trans-4-(trans-4-Methylcyclohexyl)cyclohexyl]-2-(4-perfluorooctylphenyl)-ethane
1-[trans-4-(trans-4-Ethylcyclohexyl)cyclohexyl]-2-(4-perfluorooctylphenyl)-ethane
1-[trans-4-(trans-4-Propylcyclohexyl)cyclohexyl]-2-(4-perfluorooctylphenyl)-ethane
1-[trans-4-)trans-4-Butylcyclohexyl)cyclohexyl]-2-(4-perfluorooctylphenyl)-ethane
1-[trans-4-(trans-4-Pentylcyclohexyl)cyclohexyl]-2-(4-perfluorooctylphenyl)-ethane
1-[trans-4-(trans-4-Hexylcyclohexyl)cyclohexyl]-2-(4-perfluorooctylphenyl)-ethane
1-[trans-4-(trans-4-Heptylcyclohexyl)cyclohexyl]-2-(4-perfluorooctylphenyl)-ethane
1-(trans-4-Methylcyclohexyl)-2-[trans-4-(4-perfluorononylphenyl)-cyclohexyl]-ethane
1-(trans-4-Ethylcyclohexyl)-2-[trans-4-(4-perfluorononylphenyl)-cyclohexyl]-ethane
1-(trans-4-Propylcyclohexyl)-2-[trans-4-(4-perfluorononylphenyl)-cyclohexyl]-ethane
1-(trans-4-Butylcyclohexyl)-2-[trans-4-(4-perfluorononylphenyl)-cyclohexyl]-ethane
1-(trans-4-Pentylcyclohexyl)-2-[trans-4-(4-perfluorononylphenyl)-cyclohexyl]-ethane
1-(trans-4-Hexylcyclohexyl)-2-[trans-4-(4-perfluorononylphenyl)-cyclohexyl]-ethane
1-(trans-4-Heptylcyclohexyl)-2-[trans-4-(4-perfluorononylphenyl)-cyclohexyl]-ethane
1-(trans-4-Methylcyclohexyl)-2-[trans-4-(4-perfluorooctylphenyl)-cyclohexyl]-ethane
1-(trans-4-Ethylcyclohexyl)-2-[trans-4-(4-perfluorooctylphenyl)-cyclohexyl]-ethane
1-(trans-4-Propylcyclohexyl)-2-[trans-4-(4-perfluorooctylphenyl)-cyclohexyl]-ethane
1-(trans-4-Butylcyclohexyl)-2-[trans-4-(4-perfluorooctylphenyl)-cyclohexyl]-ethane
1-(trans-4-Pentylcyclohexyl)-2-[trans-4-(4-perfluorooctylphenyl)-cyclohexyl]-ethane
1-(trans-4-Hexylcyclohexyl)-2-[trans-4-(4-perfluorooctylphenyl)-cyclohexyl]-ethane
1-(trans-4-Heptylcyclohexyl)-2-[trans-4-(4-perfluorooctylphenyl)-cyclohexyl]-ethane

EXAMPLE 13

0.1 mol of dicyclohexylcarbodiimide (DCC) in 30 ml of $CH_2Cl_2$ is added with stirring at about 10° to a mixture of 0.1 mol of 4-(pentafluoroethyl)-phenol (preparation analogously to Bull. Chem. Soc. Japan, 57 (1984) 3361), 0.1 mol of trans-4-(trans-4-pentylcyclohexyl)-cyclohexanecarboxylic acid and 0.01 mol of dimethylamino-pyridine and 150 ml of $CH_2Cl_2$, and the mixture is then stirred for 15 hours at room temperature. It is filtered over silica gel, the solvent is evaporated and further purification gives 4-(pentafluoroethyl)-phenyl trans-4-(trans-4-pentylcyclohexyl)-cyclohexanoate.

The following are prepared analogously:

4-(Pentafluoroethyl)-phenyl trans-4-(trans-4-methylcyclohexyl)-cyclohexanoate
4-(Pentafluoroethyl)-phenyl trans-4-(trans-4-ethylcyclohexyl)-cyclohexanoate
4-(Pentafluoroethyl)-phenyl trans-4-(trans-4-propylcyclohexyl)-cyclohexanoate
4-(Pentafluoroethyl)-phenyl trans-4-(trans-4-butylcyclohexyl)-cyclohexanoate
4-(Pentafluoroethyl)-phenyl trans-4-(trans-4-hexylcyclohexyl)-cyclohexanoate
4-(Pentafluoroethyl)-phenyl trans-4-(trans-4-heptylcyclohexyl)-cyclohexanoate

EXAMPLE 14

0.1 mol of trans-4-butylcyclohexanecarboxylic acid chloride is added at 80° to a mixture of 0.1 mol of 4-(pentafluoroethyl)-phenol (preparation analogously to Bull. Chem. Soc. Japan, 57, (1984) 3361) and 0.1 mol of pyridine in 100 ml of toluene, and the mixture is stirred for 3 hours. The pyridine hydrochloride is then filtered off with suction, the toluene solution is washed with water and dried, and the solvent is then distilled off. After purification by recrystallization, this gives 4-(pentafluoroethyl)-phenyl-trans-4-butylcyclohexanoate.

The following are prepared analogously:
4-(Pentafluoroethyl)-phenyl trans-4-methylcyclohexanoate
4-(Pentafluoroethyl)-phenyl trans-4-ethylcyclohexanoate
4-(Pentafluoroethyl)-phenyl trans-4-propylcyclohexanoate
4-(Pentafluoroethyl)-phenyl trans-4-pentylcyclohexanoate
4-(Pentafluoroethyl)-phenyl trans-4-hexylcyclohexanoate
4-(Pentafluoroethyl)-phenyl trans-4-heptylcyclohexanoate

EXAMPLE 15

With exclusion of moisture, 0.1 mol of DCC in methylene chloride is added at 5° to a mixture of 0.1 mol of trans-4-pentylcyclohexanecarboxylic acid, 0.1 mol of hydroquinone monoperfluoroethyl ether (prepared from 4-perfluoroethyloxybenzoic acid by Hofmann degradation, diazotization and boiling down of the diazonium salt), a catalytic quantity of dimethylaminopyridine and methylene chloride. The mixture is then stirred for 12 hours at room temperature, filtered and worked up in the usual way. After purification, this gives 4-(pentafluoroethoxy)-phenyl trans-4-pentylcyclohexanoate.

The following are prepared analogously:
4-(Pentafluoroethoxy)-phenyl trans-4-methylcyclohexanoate
4-(Pentafluoroethoxy)-phenyl trans-4-ethylcyclohexanoate
4-(Pentafluoroethoxy)-phenyl trans-4-propylcyclohexanoate
4-(Pentafluoroethoxy)-phenyl trans-4-butylcyclohexanoate
4-(Pentafluoroethoxy)-phenyl trans-4-hexylcyclohexanoate
4-(Pentafluoroethoxy)-phenyl trans-4-heptylcyclohexanoate
4-(Pentafluoroethoxy)-phenyl trans-4-(trans-4-methylcyclohexyl)-cyclohexanoate
4-(Pentafluoroethoxy)-phenyl trans-4-(trans-4-(ethylcyclohexyl)-cyclohexanoate
4-(Pentafluoroethoxy)-phenyl trans-4-(trans-4-(propylcyclohexyl)-cyclohexanoate
4-(Pentafluoroethoxy)-phenyl trans-4-(trans-4-(butylcyclohexyl)-cyclohexanoate
4-(Pentafluoroethoxy)-phenyl trans-4-(trans-4-pentylcyclohexyl)-cyclohexanoate
4-(Pentafluoroethoxy)-phenyl trans-4-(trans-4-hexylcyclohexyl)-cyclohexanoate
4-(Pentafluoroethoxy)-phenyl trans-4-(trans-4-heptylcyclohexyl)-cyclohexanoate

EXAMPLE 16

A mixture of 0.1 mol of 4-(trans-4-propylcyclohexyl)-cyclohex-1-ene, 0.1 mol of heptafluoropropyl iodide, 10 mol % of tetrakis-(triphenylphosphine)-palladium and 200 ml of hexane is heated under reflux for 24 hours (compare T. Ishihara, Chemistry Letters (1986) 1895). The isomer mixture of the addition product thus formed is, after the catalyst has been filtered off, first heated with tributyl-tin hydride for 90 hours in toluene and reduced. The all-trans product, trans-4-(trans-4-propylcyclohexyl)-1-heptafluoropropylcyclohexane, is finally obtained by separating the thiourea inclusion compound from a solution in methanol.

The following are prepared analogously:
trans-4-(trans-4-Butylcyclohexyl)-1-heptafluoropropylcyclohexane
trans-4-(trans-4-Pentylcyclohexyl)-1-heptafluoropropylcyclohexane
trans-4-(trans-4-Heptylcyclohexyl)-1-heptafluoropropylcyclohexane
trans-4-(trans-4-Propylcyclohexyl)-1-nonafluorobutylcyclohexane
trans-4-(trans-4-Butylcyclohexyl)-1-nonafluorobutylcyclohexane
trans-4-(trans-4-Pentylcyclohexyl)-1-nonafluorobutylcyclohexane
trans-4-(trans-4-Heptylbutylcyclohexyl)-1-nonafluorobutylcyclohexane
trans-4-(trans-4-Propylcyclohexyl)-1-tridecafluorohexylcyclohexane
trans-4-(trans-4-Butylcyclohexyl)-1-tridecafluorohexylcyclohexane trans-4-(trans-4-Pentylcyclohexyl)-1-tridecafluorohexylcyclohexane
trans-4-(trans-4-Heptylcyclohexyl)-1-tridecafluorohexylcyclohexane
1-(trans-4-Propylcyclohexyl)-2-(trans-4-heptafluoropropylcyclohexyl)-ethane
1-(trans-4-Butylcyclohexyl)-2-(trans-4-heptafluoropropylcyclohexyl)-ethane
1-(trans-4-Pentylcyclohexyl)-2-(trans-4-heptafluoropropylcyclohexyl)-ethane
1-(trans-4-Heptylcyclohexyl)-2-(trans-4-heptafluoropropylcyclohexyl)-ethane
1-(trans-4-Propylcyclohexyl)-2-(trans-4-nonafluorobutylcyclohexyl)-ethane
1-(trans-4-Butylcyclohexyl)-2-(trans-4-nonafluorobutylcyclohexyl)-ethane
1-(trans-4-Pentylcyclohexyl)-2-(trans-4-nonafluorobutylcyclohexyl)-ethane
1-(trans-4-Heptylcyclohexyl)-2-(trans-4-nonafluorobutylcyclohexyl)-ethane
1-(trans-4-Propylcyclohexyl)-2-(trans-4-tridecafluorohexylcyclohexyl)-ethane
1-(trans-4-Butylcyclohexyl)-2-(trans-4-tridecafluorohexylcyclohexyl)-ethane
1-(trans-4-Pentylcyclohexyl)-2-(trans-4-tridecafluorohexylcyclohexyl)-ethane
1-(trans-4-Heptylcyclohexyl)-2-(trans-4-tridecafluorohexylcyclohexyl)-ethane

EXAMPLE 17

A mixture of 0.06 mol of 1-[trans-4-(trans-4-propylcyclohexyl)-cyclohexyl]-ethene (obtainable analogously to Negishi, Acc. Chem. Res. 15 (1982) 340 by coupling of vinyl bromide with di-[trans-4-(trans-4-propylcyclohexyl)-cyclohexyl]-zinc), 0.06 mol of 4-(3,3,4,4,5,5,5-heptafluoropentyl)-bromobenzene (preparation analogously to R. F. Heck in Org. Reactions, 27 (1982) 345 from 1,4-dibromobenzene and 3,3,4,4,5,5,5-heptafluoropent-1-ene with subsequent hydrogenation), 0.06 mol of triethylamine, 0.27 g of Pd(II) acetate, 0.74 g of tri-o-tolylphosphine and 75 g of acetonitrile is heated for 120 hours under reflux.

After evaporation and removal of the water-soluble hydrobromide, the product is purified by chromatography and hydrogenated in THF over 1.5 g of Pd/C. After working-up and purification, this gives 1-[trans-4-(trans-4-propylcyclohexyl)-cyclohexyl]-2-[4-(3,3,4,4,5,5,5-heptafluoropentyl)-phenyl]-ethane.
1-[trans-4-(trans-4-Pentylcyclohexyl)-cyclohexyl]-2-[4-(3,3,4,4,5,5,5-heptafluoropentyl)-ethane
1-[trans-4-(trans-4-Propylcyclohexyl)-cyclohexyl]-2-[4-(3,3,4,4,5,5,6,6,7,7,8,8,8-tridecafluorooctyl]-ethane
1-[trans-4-(trans-4-Pentylcyclohexyl)-cyclohexyl]-2-[4-(3,3,4,4,5,5,6,6,7,7,8,8,8-tridecafluorooctyl]-ethane

EXAMPLE 18

A mixture of 0.05 mol of di-[trans-4-(trans-4-propylcyclohexyl)cyclohexyl]-zinc (preparation analogously to Luche in J. Org. Chem. 50 (1985) 5761), 0.4 g of tetrakis-(triphenylphosphine)-palladium, 0.05 mol of 4-(3,3,4,4,5,5,5-heptafluoropentyl)-bromobenzene (compare Example 17) and THF is stirred for 24 hours at room temperature. After stripping off the solvent, extracting the residue with dilute HCl/toluene and purifying the crude product by chromatography and/or recrystallization, this gives 4-(3,3,4,4,5,5,5-heptafluoropentyl)-1-[trans-4-(trans-4-propylcyclohexyl)-cyclohexyl]-benzene.

The following are prepared analogously:

4-(3,3,4,4,5,5,5-Heptafluoropentyl)-1-[trans-4-(trans-4-pentylcyclohexyl)-cyclohexyl]-benzene 4-(3,3,4,4,5,5,5-Heptafluoropentyl)-1-[trans-4-(trans-4-butylcyclohexyl)-cyclohexyl]-benzene 4-(3,3,4,4,5,5,6,6,7,7,8,8,8-Tridecafluorooctyl)-1-[trans-4-(trans-4-propylcyclohexyl)-cyclohexyl]-benzene 4-(3,3,4,4,5,5,6,6,7,7,8,8,8-Tridecafluorooctyl)-1-[trans-4-(trans-4-pentylcyclohexyl)-cyclohexyl]-benzene 4-(3,3,4,4,5,5,6,6,7,7,8,8,8-Tridecafluorooctyl)-1-[trans-4-(trans-4-butylcyclohexyl)-cyclohexyl]-benzene

EXAMPLE 19

0.05 mol of trans-4-propylcyclohexanecarboxylic acid chloride in 10 ml of toluene is added in (sic) a mixture of 0.05 mol of pyridine and 4-(3,3,4,4,5,5,5-heptafluoropentyl)-phenol (obtainable via a Heck coupling of 4-bromophenyl benzyl ether with 3,3,4,4,5,5,5-heptafluoropent-1-ene and subsequent hydrogenation and ether cleavage) and the mixture is stirred for 24 hours at room temperature. Hours (sic). After working-up and purification, this gives 4-(3,3,4,4,5,5,5-heptafluoropentyl)-phenyl trans-4-propylcyclohexanoate.

The following are prepared analogously:

4-(3,3,4,4,5,5,5-Heptafluoropentyl)-phenyl trans-4-butylcyclohexanoate 4-(3,3,4,4,5,5,5-Heptafluoropentyl)-phenyl trans-4-pentylcyclohexanoate 4-(3,3,4,4,5,5,5-Heptafluoropentyl)-phenyl trans-4-heptylcyclohexanoate 4-(3,3,4,4,5,5,6,6,6-Nonafluorohexyl)-phenyl trans-4-propylcyclohexanoate 4-(3,3,4,4,5,5,6,6,6-Nonafluorohexyl)-phenyl trans-4-butylcyclohexanoate 4-(3,3,4,4,5,5,6,6,6-Nonafluorohexyl)-phenyl trans-4-pentylcyclohexanoate 4-(3,3,4,4,5,5,6,6,6-Nonafluorohexyl)-phenyl trans-4-heptylcyclohexanoate 4-(3,3,4,4,5,5,6,6,7,7,8,8,8-Tridecafluorooctyl)-phenyl trans-4-propyl-cyclohexanoate 4-(3,3,4,4,5,5,6,6,7,7,8,8,8-Tridecafluorooctyl)-phenyl trans-4-butyl-cyclohexanoate 4-(3,3,4,4,5,5,6,6,7,7,8,8,8-Tridecafluorooctyl)-phenyl trans-4-pentyl-cyclohexanoate 4-(3,3,4,4,5,5,6,6,7,7,8,8,8-Tridecafluorooctyl)-phenyl trans-4-heptyl-cyclohexanoate 4-(3,3,4,4,5,5,5-Heptafluoropentyl)-phenyl trans-4-(trans-4-propylcyclohexyl)-cyclohexanoate 4-(3,3,4,4,5,5,5-Heptafluoropentyl)-phenyl trans-4-(trans-4-butylcyclohexyl)-cyclohexanoate 4-(3,3,4,4,5,5,5-Heptafluoropentyl)-phenyl trans-4-(trans-4-pentylcyclohexyl)-cyclohexanoate 4-(3,3,4,4,5,5,5-Heptafluoropentyl)-phenyl trans-4-(trans-4-heptylcyclohexyl)-cyclohexanoate 4-(3,3,4,4,5,5,6,6,6-Nonafluorohexyl)-phenyl trans-4-(trans-4-propylcyclohexyl)-cyclohexanoate 4-(3,3,4,4,5,5,6,6,6-Nonafluorohexyl)-phenyl trans-4-(trans-4-butylcyclohexyl)-cyclohexanoate 4-(3,3,4,4,5,5,6,6,6-Nonafluorohexyl)-phenyl trans-4-(trans-4-pentylcyclohexyl)-cyclohexanoate 4-(3,3,4,4,5,5,6,6,6-Nonafluorohexyl)-phenyl trans-4-(trans-4-heptylcyclohexyl)-cyclohexanoate 4-(3,3,4,4,5,5,6,6,7,7,8,8,8-Tridecafluorooctyl)-phenyl trans-4-(trans-4-propylcyclohexyl)-cyclohexanoate 4-(3,3,4,4,5,5,6,6,7,7,8,8,8-Tridecafluorooctyl)-phenyl trans-4-(trans-4-butylcyclohexyl)-cyclohexanoate 4-(3,3,4,4,5,5,6,6,7,7,8,8,8-Tridecafluorooctyl)-phenyl trans-4-(trans-4-pentylcyclohexyl)-cyclohexanoate 4-(3,3,4,4,5,5,6,6,7,7,8,8,8-Tridecafluorooctyl)-phenyl trans-4-(trans-4-heptylcyclohexyl)-cyclohexanoate

EXAMPLE 20

A mixture of 0.05 mol of 1-[trans-4-(trans-4-propylcyclohexyl)-cyclohexyl]-ethene (compare Example 17 for preparation), 0.05 mol of heptafluoropropyl iodide, 10 mol % of tetrakis-(triphenylphosphine)-palladium and 100 ml of hexane is reacted analogously to Example 16. The addition product is isolated by means of purification by chromatography and reduced analogously to Example 16. After purification by chromatography using hexane over silica gel, this gives trans-4-(trans-4-propylcyclohexyl)-1-(3,3,4,4,5,5,5-heptafluoropentyl)-cyclohexane.

The following are prepared analogously:

trans-4-(trans-4-Butylcyclohexyl)-1-(3,3,4,4,5,5,5-heptafluoropentyl)-cyclohexane trans-4-(trans-4-Pentylcyclohexyl)-1-(3,3,4,4,5,5,5-heptafluoropentyl)-cyclohexane trans-4-(trans-4-Heptylcyclohexyl)-1-(3,3,4,4,5,5,5-heptafluoropentyl)-cyclohexane trans-4-(trans-4-(Propylcyclohexyl)-1-(3,3,4,4,5,5,6,6,6-nonafluorohexyl)-cyclohexane trans-4-(trans-4-Butylcyclohexyl)-1-(3,3,4,4,5,5,6,6,6-nonafluorohexyl)-cyclohexane trans-4-(trans-4-Pentylcyclohexyl)-1-(3,3,4,4,5,5,6,6,6-nonafluorohexyl)-cyclohexane trans-4-(trans-4-Heptylcyclohexyl)-1-(3,3,4,4,5,5,6,6,6-nonafluorohexyl)-cyclohexane trans-4-(trans-4-Propylcyclohexyl)-1-(3,3,4,4,5,5,6,6,7,7,8,8,8-tridecafluorooctyl)-cyclohexane trans-4-(trans-4-Butylcyclohexyl)-1-(3,3,4,4,5,5,6,6,7,7,8,8,8-tridecafluorooctyl)-cyclohexane trans-4-(trans-4-Pentylcyclohexyl)-1-(3,3,4,4,5,5,6,6,7,7,8,8,8-tridecafluorooctyl)-cyclohexane trans-4-(trans-4-Heptylcyclohexyl)-1-(3,3,4,4,5,5,6,6,7,7,8,8,8-tridecafluorooctyl)-cyclohexane

EXAMPLE 21

The mixture of 0.03 mol of p-(5-heptyl-pyrimidin-2-yl)-bromobenzene, 0.036..(sic) of 2,2,3,3-tetrafluoropropyl acrylate, 0.03 mol of triethylamine, 0.14 g of Pd(II) acetate, 0.4 g of tri-o-tolylphosphine and 75 ml of acetonitrile is heated under reflux for 36 hours. The mixture is then cooled to 0°, and the crude product is filtered off and washed with acetonitrile and water. After purification by crystallization, this gives 2,2,3,3-tetrafluoropropyl p-(5-heptyl-pyrimidin-2-yl)-cinnamate of m.p. 35° and c.p. 108°.

The following are prepared analogously:

2,2,3,3-Tetrafluoropropyl p-(5-ethyl-pyrimidin-2-yl)-cinnamate 2,2,3,3-Tetrafluoropropyl p-(5-propyl-pyrimidin-2-yl)-cinnamate 2,2,3,3-Tetrafluoropropyl p-(5-butyl-pyrimidin-2-yl)-cinnamate 2,2,3,3-Tetrafluoropropyl p-(5-pentyl-pyrimidin-2-yl)-cinnamate 2,2,3,3-Tetrafluoropropyl p-(5-hexyl-pyrimidin-2-yl)-cinnamate 1H,1H,5H-Octafluoropentyl p-(5-heptyl-pyrimidin-2-yl)-cinnamate, m.p. 84°, c.p. 117°

1H,1H,5H-Octafluoropentyl p-(5-ethyl-pyrimidin-2-yl)-cinnamate 1H,1H,5H-Octafluoropentyl p-(5-propyl-pyrimidin-2-yl)-cinnamate
1H,1H,5H-Octafluoropentyl p-(5-butyl-pyrimidin-2-yl)-cinnamate
1H,1H,5H-Octafluoropentyl p-(5-pentyl-pyrimidin-2-yl)-cinnamate
1H,1H,5H-Octafluoropentyl p-(5-hexyl-pyrimidin-2-yl)-cinnamate
1H,1H,2H,2H-Heptadecafluorodecyl p-(5-heptyl-pyrimidin-2-yl)-cinnamate
1H,1H,2H,2H-Heptadecafluorodecyl p-(5-ethyl-pyrimidin-2-yl)-cinnamate
1H,1H,2H,2H-Heptadecafluorodecyl p-(5-propyl-pyrimidin-2-yl)-cinnamate
1H,1H,2H,2H-Heptadecafluorodecyl p-(5-butyl-pyrimidin-2-yl)-cinnamate
1H,1H,2H,2H-Heptadecafluorodecyl p-(5-pentyl-pyrimidin-2-yl)-cinnamate
1H,1H,2H,2H-Heptadecafluorodecyl p-(5-hexyl-pyrimidin-2-yl)-cinnamate

EXAMPLE 22

0.01 mol of 2,2,3,3-tetrafluoropropyl p-(5-heptyl-pyrimidin-2-yl)-cinnamate (for preparation see Example 21) are hydrogenated in THF with Pd/C in the known manner. Usual working-up gives 2,2,3,3-tetrafluoropropyl β-[p-(5-heptyl-pyrimidin-2-yl)-phenyl]-propionate of m.p. 42° and c.p. 54°.

The following are prepared analogously:
2,2,3,3-Tetrafluoropropyl β-[p-(5-ethyl-pyrimidin-2-yl)-phenyl]-propionate
2,2,3,3-Tetrafluoropropyl β-[p-(5-propyl-pyrimidin-2-yl)-phenyl]-propionate
2,2,3,3-Tetrafluoropropyl β-[p-(5-butyl-pyrimidin-2-yl)-phenyl]-propionate
2,2,3,3-Tetrafluoropropyl β-[p-(5-pentyl-pyrimidin-2-yl)-phenyl]-propionate
2,2,3,3-Tetrafluoropropyl β-[p-(5-hexyl-pyrimidin-2-yl)-phenyl]-propionate
1H,1H,5H-Octafluoropentyl β-[p-(heptyl-pyrimidin-2-yl)-phenyl]-propionate
1H,1H,5H-Octafluoropentyl β-(p-(ethyl-pyrimidin-2-yl)-phenyl]-propionate
1H,1H,5H-Octafluoropentyl β-(p-(propyl-pyrimidin-2-yl)-phenyl]-propionate
1H,1H,5H-Octafluoropentyl β-(p-(butyl-pyrimidin-2-yl)-phenyl]-propionate
1H,1H,5H-Octafluoropentyl ß-(p-pentyl-pyrimidin-2-yl)-phenyl]-propionate
1H,1H,5H-Octafluoropentyl β-(p-hexyl-pyrimidin-2-yl)-phenyl]-propionate
1H,1H,2H,2H-Heptadecafluorodecyl β-[p-(5-heptyl-pyrimidin-2-yl)-phenyl]-propionate
1H,1H,2H,2H-Heptadecafluorodecyl β-[p-(5-ethyl-pyrimidin-2-yl)-phenyl]-propionate
1H,1H,2H,2H-Heptadecafluorodecyl β-[p-(5-propyl-pyrimidin-2-yl)-phenyl]-propionate
1H,1H,2H,2H-Heptadecafluorodecyl β-[p-(5-butyl-pyrimidin-2-yl)-phenyl]-propionate
1H,1H,2H,2H-Heptadecafluorodecyl β-[p-(5-pentyl-pyrimidin-2-yl)-phenyl]-propionate
1H,1H,2H,2H-Heptadecafluorodecyl β-[p-(5-hexyl-pyrimidin-2-yl)-phenyl]-propionate

EXAMPLE 23

A mixture of 0.2 mol of trans-4-(trans-4-propylcyclohexyl)-cyclohexylmethyl iodide, 0.2 mol of triphenylphosphine and 250 ml of acetonitrile is heated under reflux for 18 hours. After evaporation of the solvent and crystallization of the residue from toluene, 250 ml of THF and 0.2 mol of tetrafluoroethoxybenzaldehyde are added to the salt. A solution of 0.2 mol of potassium tert.-butylate in 150 ml of THF is added thereto at 0°-5° and the mixture is stirred for 1 hour at room temperature. It is then neutralized with dilute HCl, filtered and evaporated, and the residue is purified by crystallization. The olefin thus obtained is hydrogenated in THF over Pd/C (5%) at room temperature and under normal pressure.

Working-up in the usual way and purification by crystallization gives 1-[trans-4-(trans-4-propylcyclohexyl)-cyclohexyl]-2-(4-tetrafluoroethoxyphenyl)-ethane.

The following are prepared analogously:
1-[trans-4-(trans-4-Butylcyclohexyl)cyclohexyl]-2-(4-tetrafluoroethoxyphenyl)-ethane
1-[trans-4-(trans-4-Ethylcyclohexyl)cyclohexyl]-2-(4-tetrafluoroethoxyphenyl)-ethane
1-[trans-4-(trans-4-Pentylcyclohexyl)cyclohexyl]-2-(4-tetrafluoroethoxyphenyl)-ethane
1-[trans-4-(trans-4-Hexylcyclohexyl)cyclohexyl]-2-(4-tetrafluoroethoxyphenyl)-ethane
1-[trans-4-(trans-4-heptylcyclohexyl)cyclohexyl]-2-(4-tetrafluoroethoxyphenyl)-ethane
1-(trans-4-Propylcyclohexyl)-2-(4-tetrafluoroethoxyphenyl)-ethane
1-(trans-4-Butylcyclohexyl)-2-(4-tetrafluoroethoxyphenyl)-ethane
1-(trans-4-Ethylcyclohexyl)-2-(4-tetrafluoroethoxyphenyl)-ethane
1-(trans-4-Pentylcyclohexyl)-2-(4-tetrafluoroethoxyphenyl)-ethane
1-(trans-4-Hexylcyclohexyl)-2-(4-tetrafluoroethoxyphenyl)-ethane
1-(trans-4-Heptylcyclohexyl)-2-(4-tetrafluoroethoxyphenyl)-ethane

EXAMPLE 24

A mixture of 0.2 mol of 4-[trans-4-(trans-4-propylcyclohexyl)-cyclohexyl]-phenol (obtainable from the corresponding ethyl ether by ether cleavage), 80 ml of dioxane and 0.05 mol of sodium is stirred for 2.5 hours at room temperature. 40 ml of DMF are then added and the phenolate solution is heated in an autoclave with tetrafluoroethylene (2.7 bar) to 50°-70° with stirring.

This procedure is repeated until the pressure remains constant.

The reaction mixture is then treated with water and worked-up in the usual way. After purification by crystallization, this gives 4-[trans-4-(trans-4-propylcyclohexyl)-cyclohexyl]-tetrafluoroethoxybenzene.

The following are prepared analogously:
4-[trans-4-(trans-4-Ethylcyclohexyl)cyclohexyl]-tetrafluoroethoxybenzene
4-[trans-4-(trans-4-Butylcyclohexyl)cyclohexyl]-tetrafluoroethoxybenzene
4-[trans-4-(trans-4-Pentylcyclohexyl)cyclohexyl]-tetrafluoroethoxybenzene
4-[trans-4-(trans-4-Hexylcyclohexyl)cyclohexyl]-tetrafluoroethoxybenzene
4-[trans-4-(trans-4-Heptylcyclohexyl)cyclohexyl]-tetrafluoroethoxybenzene

EXAMPLE 25

A mixture of 0.1 mol of 4-tetrafluoroethoxybenzaldehyde, 0.12 mol of m-chloroperbenzoic acid and 250 ml of CH$_2$Cl$_2$ is stirred for 48 hours at room temperature.

The reaction mixture is washed with H₂O, dried and evaporated. The residue is stirred for 2.5 hours at room temperature with 200 ml of about 8% NaOH. The mixture is then washed with petroleum ether and acidified. The phenol is taken up in CH₂Cl₂, and the phase is washed with water, dried and evaporated.

0.1 mol of pyridine is added, while cooling with ice, to this crude product with 0.1 mol of trans-4-pentylcyclohexylcarboxylic acid chloride in 100 ml of CH₂Cl₂. Stirring is continued for 6 hours at room temperature, and the mixture is worked-up by extraction. After purification by crystallization this gives 4-tetrafluoroethoxyphenyl trans-4-pentylcyclohexanecarboxylate.

The following are prepared analogously:
4-Tetrafluoroethoxyphenyl trans-4-ethylcyclohexanecarboxylate
4-Tetrafluoroethoxyphenyl trans-4-butylcyclohexanecarboxylate
4-Tetrafluoroethoxyphenyl trans-4-propylcyclohexanecarboxylate
4-Tetrafluoroethoxyphenyl trans-4-hexylcyclohexanecarboxylate
4-Tetrafluoroethoxyphenyl trans-4-heptylcyclohexanecarboxylate
4-Tetrafluoroethoxyphenyl trans-4-(trans-4-pentylcyclohexyl)-cyclohexanecarboxylate
4-Tetrafluoroethoxyphenyl trans-4-(trans-4-ethylcyclohexyl)-cyclohexanecarboxylate
4-Tetrafluoroethoxyphenyl trans-4-(trans-4-butylcyclohexyl)-cyclohexanecarboxylate
4-Tetrafluoroethoxyphenyl trans-4-(trans-4-propylcyclohexyl)-cyclohexanecarboxylate
4-Tetrafluoroethoxyphenyl trans-4-(trans-4-hexylcyclohexyl)-cyclohexanecarboxylate
4-Tetrafluoroethoxyphenyl trans-4-(trans-4-heptylcyclohexyl)-cyclohexanecarboxylate

EXAMPLE 26

0.05 mol of n-butyllithium is added at $-10°--0°$ to a mixture of 0.05 mol of 4-bromo-tetrafluoroethoxybenzene and 200 ml of ether. 0.05 mol of 4-(trans-4-pentylcyclohexylethyl)-cyclohexanone (obtainable by reacting methoxybenzene with trans-4-pentylcyclohexylmethylcarboxylic acid chloride in the presence of AlCl₃, subsequent hydrogenation with H₂/Pd, reaction with HBr and repeated hydrogenation with H₂/Raney nickel) in 50 ml of ether is then added at this temperature. The mixture is stirred for 1 hour at room temperature and worked up by extraction, and the resulting residue is boiled for 2 hours with 1 g of p-toluenesulfonic acid and 200 ml of toluene under a water separator.

The cyclohexene compound thus obtained is hydrogenated in THF over 1 g of Pd/C under normal pressure. The mixture is worked up and, after purification by crystallization, this gives 1-(trans-4-pentylcyclohexyl)-2-[trans-4-(4-tetrafluoroethoxyphenyl)-cyclohexyl]-ethane.

The following are prepared analogously:
1-(trans-4-Ethylcyclohexyl)-2-[trans-4-(4-tetrafluoroethoxyphenyl)-cyclohexyl]-ethane
1-(trans-4-Propylcyclohexyl)-2-[trans-4-(4-tetrafluoroethoxyphenyl)-cyclohexyl]-ethane
1-(trans-3-Butylcyclohexyl)-2-[trans-4-(4-tetrafluoroethoxyphenyl)-cyclohexyl]-ethane
1-(trans-4-Hexylcyclohexyl)-2-[trans-4-(4-tetrafluoroethoxyphenyl)-cyclohexyl]-ethane
1-(trans-4-Heptylcyclohexyl)-2-[trans-4-(4-tetrafluoroethoxyphenyl)-cyclohexyl]-ethane

We claim:

1. An electro-optical liquid crystal display element, based on an effect from the group consisting of the twisted cell, guest-host, deformation of aligned phase, dynamic scattering, SBE and STN effects, containing a dielectric with at least two liquid-crystalline components, characterized in that, for shortening the switching times, the dielectric contains at least one fluorine-containing compound of the formula I

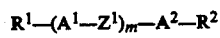

$$R^1-(A^1-Z^1)_m-A^2-R^2 \quad\quad I$$

wherein one of the radicals $R^1$ and $R^2$ is H, F, Cl, Br, —CN, —NCS or an unsubstituted straight-chain alkyl group having 1-15 C atoms, in which one or two CH₂ groups can also be replaced by a grouping selected from the group comprising —O—, —CO—, —O—CO—, —CO—O—, —C≡C— and —CH=CH—, no 2 heteroatoms being directly linked to one another, the other radical $R^1$ or $R^2$ has the formula

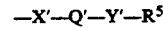

$$-X'-Q'-Y'-R^5$$

in which

X' is —CO—, —O—CO—, —O—, or a single bond,
Q' is alkylene having 2 to 5 C atoms,
Y' is perfluoroalkylene having 2 to 15 C atoms, in which one or more CF₂ groups can also be replaced by —CHF— or —CF=CF—, and
$R^5$ is H, F, or an alkyl group having 1 to 5 C atoms, with the proviso that the group of the formula —X'—Q'—Y'—$R^5$ does not contain more than 15 C atoms in total and contains at least two CF₂ groups, $A^1$ and $A^2$ independently of one another are each 1,4-phenylene which is unsubstituted or substituted by one or two F and/or Cl atoms and/or CH₃ groups and/or CN groups and in which one or two CH groups can also be replaced by N atoms, 1,4-cyclohexylene in which one or two non-adjacent CH₂ groups can also be replaced by O atoms and/or S atoms, piperidine-1,4-diyl, 1,4-bicyclo[2.2.2]octylene, unsubstituted or CN-substituted decahydronaphthalene-2,6-diyl or 1,2,3,4,-tetrahydronaphthalene-2,6-diyl, and $A^2$ is optionally a single bond, m is 0, 1, 2 or 3 and
$Z^1$ is —CO—O—, —O—CO—, —OCH₂—, —CH₂O—, —CH₂—CH₂—, substituted ethylene or a single bond, it being possible for the groups $A^1$ to be identical or different and the groups $Z^1$ to be identical or different in the case of m=2 or 3, with the proviso that, in the case of m=0, the sum of the number of C atoms in the two groups $R^1$ and $R^2$ is at least 8.

2. A liquid crystalline dielectric with at least two liquid-crystalline components, containing at least one compound of the formula I according to claim 1.

3. A display element according to claim 1, of Formula IV

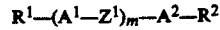

$$R^1-(A^1-Z^1)_m-A^2-R^2 \quad\quad IV$$

wherein $R^1$ is a straight chain alkyl group having 1-15 C atoms, in which one or two $CH_2$ groups can also be replaced by a grouping selected from the group comprising —O—, —CO—, —O—CO—, —CO—O—, —C≡C— and —CH=CH—, no 2 heteroatoms being directly linked to one another, $R^2$ has the formula

—X'—Q'—Y'—$R^5$ in which

X' is —CO—O, —O—CO—, —O—, or a single bond,

Q' is alkylene having 2 to 5 C atoms,

Y' is perfluoroalkylene having 2 to 15 C atoms, in which one or more $CF_2$ groups can also be replaced by —CHF— or —CF=CF—, and $R^5$ is H, F, or an alkyl group having 1 to 5 C atoms, with the proviso that the group of the formula —X'—Q'—Y'—$R^5$ does not contain more than 15 C atoms in total and contains at least two $CF_2$ groups, $A^1$ is 1,4-cyclohexylene in which one or two non-adjacent $CH_2$ groups can also be replaced by O atoms and/or S atoms, $A^2$ is 1,4-phenylene which is unsubstituted or substituted by one or two F atoms, m is 1 or 2 and $Z^1$ is —CO—O—, —O—CO—, —OCH$_2$—, —OCH$_2$O—, —CH$_2$—CH$_2$— or a single bond.

4. A fluorine-containing compound of the formula:

$$R^1-(A^1-Z^1)_m-A^2-R^2 \qquad I$$

wherein one of the radicals $R^1$ and $R^2$ is F, Cl, Br, —CN, —NCS, or a straight-chain alkyl group having 1-5 C atoms, in which one or two $CH_2$ groups can also be replaced by a grouping selected from the group comprising —O— and —CH=CH—, no two oxygen atoms being directly linked to one another, the other radical $R^1$ or $R^2$ is of the formula

—X'—Q'—Y'—$R^5$ in which

X' is —CO—O—, —O—CO—, —O—, or a single bond,

Q' is alkylene having 2-5 C atoms,

Y' is perfluoroalkylene having 2-15 C atoms, and $R^5$ is H or F, with the proviso that the group of the formula —X'—Q'—Y'—$R^5$ does not contain more than 15 C atoms in total, $A^1$ and $A^2$ independently of one another are each 1,4-phenylene which is unsubstituted or substituted by one or two F atoms and in which one or two CH groups can also be replaced by N atoms, 1,4-cyclohexylene in which one or two non-adjacent $CH_2$ groups can also be replaced by O atoms, m is 1, 2, or 3, and $Z^1$ is [—CO—O—, —O—CO—, —OCH$_2$—, —CH$_2$O—,] —CH$_2$—CH$_2$—, or a single bond, it being possible for the groups $A^1$ to be identical or different and the groups $Z^1$ to be identical or different in the case of m=2 or 3.

5. A compound according to claim 4, of the formula IV $$R^1-(A^1-Z^1)_m-A^2-R^2 \qquad IV$$

wherein $R^1$ is an alkyl group having 1-15 C atoms, in which one or two $CH_2$ groups can also be replaced by —O— or —CH=CH—, no two oxygen atoms being directly linked to one another $R^2$ has the formula

—X'—Q'—Y'—$R^5$ in which

X' is —CO—O, —O—CO—, —O—, or a single bond,

Q' is alkylene having 2 to 5 C atoms,

Y' is perfluoroalkylene having 2 to 15 C atoms, in which one or more $CF_2$ groups can also be replaced by —CHF— or —CF=CF—, and $R^5$ is H, F, or an alkyl group having 1 to 5 C atoms, with the proviso that the group of the formula —X'—Q'—Y'—$R^5$ does not contain more than 15 C atoms in total and contains at least two $CF_2$ groups, $A^1$ is 1,4-cyclohexylene, $A^2$ is 1,4-phenylene which is unsubstituted or substituted by one or two F atoms, m is 1 or 2, and $Z^1$ is —CH$_2$—CH$_2$—, or a single bond, it being possible for the groups $Z^1$ to be identical or different in the case of m=2.

6. A fluorine-containing compound of the formula:

$$R^1-(A^1-Z^1)_m-A^2-R^2 \qquad I$$

wherein one of the radicals $R^1$ and $R^2$ is a straight-chain alkyl group having 1-15 C atoms, in which one or two $CH_2$ groups can also be replaced by —O—, no two oxygen atoms being directly linked to one another, the other radical $R^1$ or $R^2$ is of the formula

—X'—Q'—Y'—$R^5$ in which

X' is —CO—O—, —O—, or a single bond,

Q' is alkylene having 2-5 C atoms,

Y' is perfluoroalkylene having 2-15 C atoms, and $R^5$ is H or F, with the proviso that the group of the formula —X'—Q'—Y'—$R^5$ does not contain more than 15 C atoms in total, $A^1$ and $A^2$ independently of one another are each 1,4-phenylene which is unsubstituted or substituted by one F atom and in which one or two CH groups can also be replaced by N atoms or 1,4-cyclohexylene, m is 1 or 2, and $Z^1$ is a single bond, it being possible for the groups $A^1$ and $Z^1$ to be identical or different in the case of m=2.

7. A compound according to claim 6, of the formula IV $$R^1-(A^1-Z^1)_m-A^2-R^2 \qquad IV$$

wherein $R^1$ is an alkyl group having 1-15 C atoms, in which one or two $CH_2$ groups can also be replaced by —O—, no two oxygen atoms being directly linked to one another, $R^2$ has the formula

—X'—Q'—Y'—R⁵ in which
- X' is —CO—O, —O—CO—, —O—, or a single bond,
- Q' is alkylene having 2 to 5 C atoms,
- Y' is perfluoroalkylene having 2 to 15 C atoms, in which one or more CH$_2$ groups can also be replaced by —CHF— or —CF=CF—, and
- R⁵ is H, F, or an alkyl group having 1 to 5 C atoms, with the proviso that the group of the formula —X'—Q'—Y'—R⁵ does not contain more than 15 C atoms in total and contains at least two CF$_2$ groups,
- A¹ is 1,4-cyclohexylene,
- A² is 1,4-phenylene which is unsubstituted or substituted by one F atom,
- m is 1 or 2, and
- Z¹ is —CH$_2$—CH$_2$— or a single bond, it being possible for the group Z¹ to be identical or different in the case of m=2.

8. An electro-optical liquid crystal element, based on an effect from the group consisting of the twisted cell, guest-host, deformation of aligned phase, dynamic scattering, SBE and STN effects, containing a dielectric with at least two liquid-crystalline components, characterized in that, for shortening the switching times, the dielectric contains at least one fluorine-containing compound of the formula I

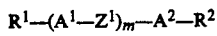     I wherein
one of the radicals R¹ and R² is H, F, Cl, Br, —CN, —NCS or an unsubstituted or substituted straight-chain alkyl group having 1-15 C atoms, in which one or two CH$_2$ groups can also be replaced by a grouping selected from the group comprising —O—, —CO—, —O—CO—, —CO—O—, —CH—halogen—, —CHCN—, —CCH$_3$CN—, —C≡C— and —CH=CH—, no 2 heteroatoms being directly linked to one another, the other radical R¹ or R² is —OCF$_2$CF$_2$H or —CF$_2$CF$_2$H, and A¹ and A² independently of one another are each 1,4-phenylene which is unsubstituted or substituted by one or two F and/or Cl atoms and/or CH$_3$ groups and/or CN groups and in which one or two CH groups can also be replaced by N atoms, 1,4-cyclohexylene in which one or two non-adjacent CH$_2$ groups can also be replaced by O atoms and/or S atoms, piperidine-1,4-diyl, 1,4-bicyclo[2.2.2]octylene, unsubstituted or CN-substituted decahydronaphthalene-2,6-diyl or 1,2,3,4,-tetrahydronaphthalene-2,6-diyl, and A² is a single bond, m is 0, 1, 2 or 3 and Z¹ is —CO—O—, —O—CO—, —OCH$_2$—, —CH$_2$—CH$_2$—, substituted ethylene or a single bond, it being possible for the groups A¹ to be identical or different and for the groups Z¹ to be identical or different in the case of m=2 or 3.

* * * * *